United States Patent [19]

Bhargava et al.

[11] Patent Number: 5,832,477
[45] Date of Patent: *Nov. 3, 1998

[54] METHOD AND APPARATUS FOR REORDERING COMPLEX SQL QUERIES CONTAINING INNER AND OUTER JOIN OPERATIONS

[75] Inventors: Gautam Bhargava, Cupertino; Piyush Goel, Monte Sereno; Balakrishna Ragmavendra Iyer, San Jose, all of Calif.

[73] Assignee: International Business Machines Corporation, Armonk, N.Y.

[ * ] Notice: The term of this patent shall not extend beyond the expiration date of Pat. No. 5,680,603.

[21] Appl. No.: 856,198

[22] Filed: May 14, 1997

Related U.S. Application Data

[63] Continuation of Ser. No. 326,461, Oct. 20, 1994, Pat. No. 5,680,603.

[51] Int. Cl.⁶ .................................................. G06F 17/30
[52] U.S. Cl. ................................................................ 707/2
[58] Field of Search ...................................... 707/1, 2, 3

[56] References Cited

U.S. PATENT DOCUMENTS

| | | | |
|---|---|---|---|
| 4,769,772 | 9/1988 | Dwyer ......................................... | 707/2 |
| 4,829,427 | 5/1989 | Green .......................................... | 707/4 |
| 5,091,852 | 2/1992 | Tsunchida et al. .......................... | 707/2 |
| 5,367,675 | 11/1994 | Cheng et al. ................................ | 707/2 |
| 5,412,804 | 5/1995 | Krishna ....................................... | 707/2 |
| 5,423,035 | 6/1995 | DePrez ........................................ | 707/2 |
| 5,551,031 | 8/1996 | Cheng et al. ............................... | 707/2 |
| 5,557,791 | 9/1996 | Cheng et al. ............................... | 707/2 |
| 5,680,603 | 10/1997 | Bhargava et al. .......................... | 707/2 |

OTHER PUBLICATIONS

Apers, P.M.G., Hevner, A.R. and Yao, S.B., "Optimization Algorithms for Distributed Queries," *IEEE Trans. Softw. Eng.*, ,pp.57–68, Jan. 1983.

Dayal, Umeshwar, "Processing Queries with Quantifiers: A Horticultural Approach", *ACM PODS*, pp. 125–136, 1983.

Dayal, UMeshwar, "Of Nests and Trees: A Unified Approach to Processing Queries That Contain Nested Subqueries, Aggregates, and Quantifiers", *VLDB*, pp. 197–208, 1987.

Galindo–Legaria, C.A., Rosenthal, A., "How to Extend a Conventional Optimizer to Handle One and Two–Sided Outerjoin", *IEEE Proceedings of Data Engineering*, pp. 402–409, 1992.

Galindo–Legaria, C.A., "Algebraic Optimzation of Outerjoin Queries", Ph.D. dissertation, Center for Research in Computing Technology, Harvard University, Cambridge, MA, 1992.

Lafortune, S. and Wong, E., "A State Transition Model for Distributed Query Processing", *ACM Transactions on Database Systems*, vol. 11, No. 3, pp. 294–322, Sept. 1986.

(List continued on next page.)

*Primary Examiner*—Thomas G. Black
*Assistant Examiner*—Jack M. Choules
*Attorney, Agent, or Firm*—Gates & Cooper

[57] ABSTRACT

A method and apparatus for reordering complex SQL queries containing joins, outer and full outer joins. The method and apparatus first translates the query into a hypergraph representation. Required sets, conflict sets and preserved sets are then generated for the query hypergraph. Using the required sets, a plurality of plans are enumerated, wherein the plans represent associative re-orderings of relations in the query. SQL operators are selectively assigned to each of the enumerated plans using the conflict sets and/or preserved sets, so that the results from the plans are identical to the original query. A novel Modified General Outer Join (MGOJ) operator may be assigned to the root of a sub-tree, wherein the MGOJ operator is a compensation operator. The operator assignment is performed recursively for the root of each sub-tree in the plan. One of the enumerated plans (generally the most optimal) is then selected for execution.

24 Claims, 15 Drawing Sheets

OTHER PUBLICATIONS

Lohman, G.M., Mohan, C., Haas, L.M., Lindsay, B.G., Selinger, P.G., Wilms, P.F. and Daniels, D., "Query Processing in R*", Res. Rep. RJ 4272, IBM Research Laboratory, San Jose, Ca., Apr. 1984.

Paulley, G.N. and Per–Ake Larson, "Exploiting Uniquences in Query Optimazation", *CASCON*, pp.804–822, vol. II, Oct. 1993.

Pirahesh, H., Hellerstein, J.M. and Hasan, W. "Extensible/Rule Based Query Rewrite Optimization", *ACM SIGMOD*, pp.39–48, CA, Jun. 1992.

Rosenthal, A. and Galindo–Legaria, C., "Query Graphs, Implementing Trees, and Freely–Reorderable Outerjoins", *ACM SIGMOND*, pp. 291–299, 1990.

Selinger, P.G., Anstrahan, M.M., Chamberlin, D.D., Lorie, R.A. and Price, T.G., "Access Path Selection in a Relational Database Management System", *ACM SIGMOND*, pp. 23–34, 1979.

Kim, Won, IBM Research On Optimizing an SQL–Like Nested Query, *ACM Transactions On Database Systems*, vol. 7, No. 3, Sep. 1982.

Ganski et al., "Optimization of Nested SQL Queries Revisited", *ACM*, 1987, pp.23–33.

Haas, et al., "Extensible Query Processing in Starburst", IBM Almaden Research Center, San Jose, CA(US), ACM 1989, pp. 377–388.

Date, C.J. & Darwen, Hugh., "The Role of Functional Dependence in Query Decompositio n", *Relational Database Writings 1989–1991,* Part II, pp. 133–154.

Levy et al., "Query Optimization by Predicate Move–Around", *Proceedings of the 20th VLDB Conference,* Santiago, Chile, 1994, pp. 96–107.

Ceri, Stephano and Pelagatti, G., "Distributed Databases—Principles and Systems," McGraw–Hill Computer Science Series, New York, 1984, pp. 93–1972.

Date, C. J., "The Outer Join", *Proceedings of the Second International Conference on Databases,* Cambridge, England, Sep. 1983, pp. 76–106.

Lee, B.S. and Wiederhold G. "Outer Joins and Filters for Instantiating Objects from Relational Databases Through Views", *IEEE Transactions on Knowledge and Data Engineering,* vol. 6, No. 1, Feb. 1994, pp. 108–119.

METHOD AND APPARATUS FOR REORDERING COMPLEX SQL QUERIES CONTAINING INNER AND OUTER JOIN OPERATIONS

CROSS-REFERENCE TO RELATED APPLICATION

This application is a continuation of and commonly-assigned patent application Ser. No. 08/326,461, entitled "METHOD AND APPARATUS FOR REORDERING COMPLEX SQL QUERIES CONTAINING INNER AND OUTER JOIN OPERATIONS," filed on Oct. 20, 1994, by Gautam Bhargava et al., attorney's docket number ST994020A, now U.S. Pat. No. 5,680,603, which application is incorporated by reference herein.

BACKGROUND OF THE INVENTION

1. Field of the Invention

This invention relates in general to database management systems performed by computers, and in particular to method and apparatus for reordering complex SQL queries in a relational database management system.

2. Description of Related Art

Relational DataBase Management System (RDBMS) products using a Structured Query Language (SQL) interface are well known in the art. The SQL interface has evolved into a standard language for RDBMS products and has been adopted as such by both the American Nationals Standard Organization (ANSI) and the International Standards Organization (ISO). In RDBMS products, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

The current state-of-the-art in SQL query optimization has few solutions for optimizing query expressions involving joins, outer joins, and full outer joins. Several researchers have performed pioneering work in this area, as reflected in the following publications:

Galindo-Legaria, C., and Rosenthal, A., "How to extend a conventional optimizer to handle one- and two-sided outer joins", *Proceedings of Data Engineering*, pp. 402–409, 1992, (hereinafter referred to as "[GALI92a]");

Galindo-Legaria, C. A., "Algebraic optimization of outer join queries", *Ph.D. dissertation*, Dept. of Applied Science, Harvard University, Cambridge, 1992, (hereinafter referred to as "[GALI92b]"); and Rosenthal, A. and Galindo-Legaria, C., "Query graphs, implementing trees, and freely-reorderable outer joins", *SIGMOD*, pp. 291–299, 1990, (hereinafter referred to as "[ROSE90]").

However, there are numerous problems in the above prior art techniques. More specifically, [GALI92a], [GALI92b], and [ROSE90] make a number of assumptions that severely restrict the application of their research to real-world RDBMS products.

One assumption made in the prior art is that there are no duplicates in base relations (an unstated assumption present in [GALI92a], [GALI92b], [ROSE90]). Since most commercial RDBMS products allow duplicates in relations, the following identity in [GALI92a] and [GALI92b] does not hold in the presence of duplicates:

$$\begin{pmatrix} p_{12} \\ r_1 \rightarrow \end{pmatrix} \begin{pmatrix} p_{23} \\ r_2 \bowtie r_3 \end{pmatrix} = \begin{pmatrix} p_{12} \\ r_1 \rightarrow r_2 \end{pmatrix} GOJ[p_{23}, sch(r_1)]r_3$$

for relations $r_1$, $r_2$, and $r_3$, wherein the Generalized Outer Join (GOJ) is a specialized operator used for optimization. In the absence of this identity, [GALI92b] would not be able to consider a significant number of re-orderings for queries containing outer joins.

Another assumption made in the prior art is that projection removes all duplicates. Most commercial RDBMS products, including the DB2 family of products provided by International Business Machines Corporation, the assignee of the present invention, support two kinds of projections: one that removes duplicates (SELECT DISTINCT) and another that does not (vanilla SELECT). Duplicate elimination (for that instance, selection predicates) may be specified on an intermediate result of a query. The intermediate result may be a view or table expression that contains a projection which eliminates duplicates, e.g., where DISTINCT is specified for the attributes.

Still another assumption made in the prior art is that outer join predicates refer to exactly two relations. If an outer join predicate references more than one attribute of a view or table expression, it is possible that these attributes may come from different base relations referenced in the view or table expression.

Thus, there is a need in the art for techniques for optimizing joins, one sided outer joins, and full outer joins in SQL queries.

SUMMARY OF THE INVENTION

To overcome the limitations in the prior art described above, and to overcome other limitations that will become apparent upon reading and understanding the present specification, the present invention discloses a method for reordering complex SQL queries containing joins, outer and full outer joins. An object of the present invention is to optimize such SQL queries, and thus improve their execution time. A feature of the invention is the identification and provision of an enhanced set of re-orderings for optimizing the SQL queries. Another feature of the invention is the provision of a Modified Generalized Outer Join (MGOJ) operation for facilitating the associative reordering of the SQL queries. This enhanced set of reorderings and the MGOJ operator are not recognized by existing optimizers available in prior art relational database management systems.

The present invention first translates the query into a hypergraph representation. Required sets, conflict sets and preserved sets are then generated for the query hypergraph. Using the required sets, a plurality of plans are enumerated, wherein the plans represent associative re-orderings of relations in the query. SQL operators are selectively assigned to each of the enumerated plans using the conflict sets and/or preserved sets, so that the results from the plans are identical to the original query. The novel MGOJ operator may be assigned to the root of a sub-tree, wherein the MGOJ operator is a compensation operator that facilitates the associative reordering of the query. The operator assignment is performed recursively for the root of each sub-tree in the plan. One of the enumerated plans (generally the most optimal) is then selected for execution.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

ENVIRONMENT

Figure 1:
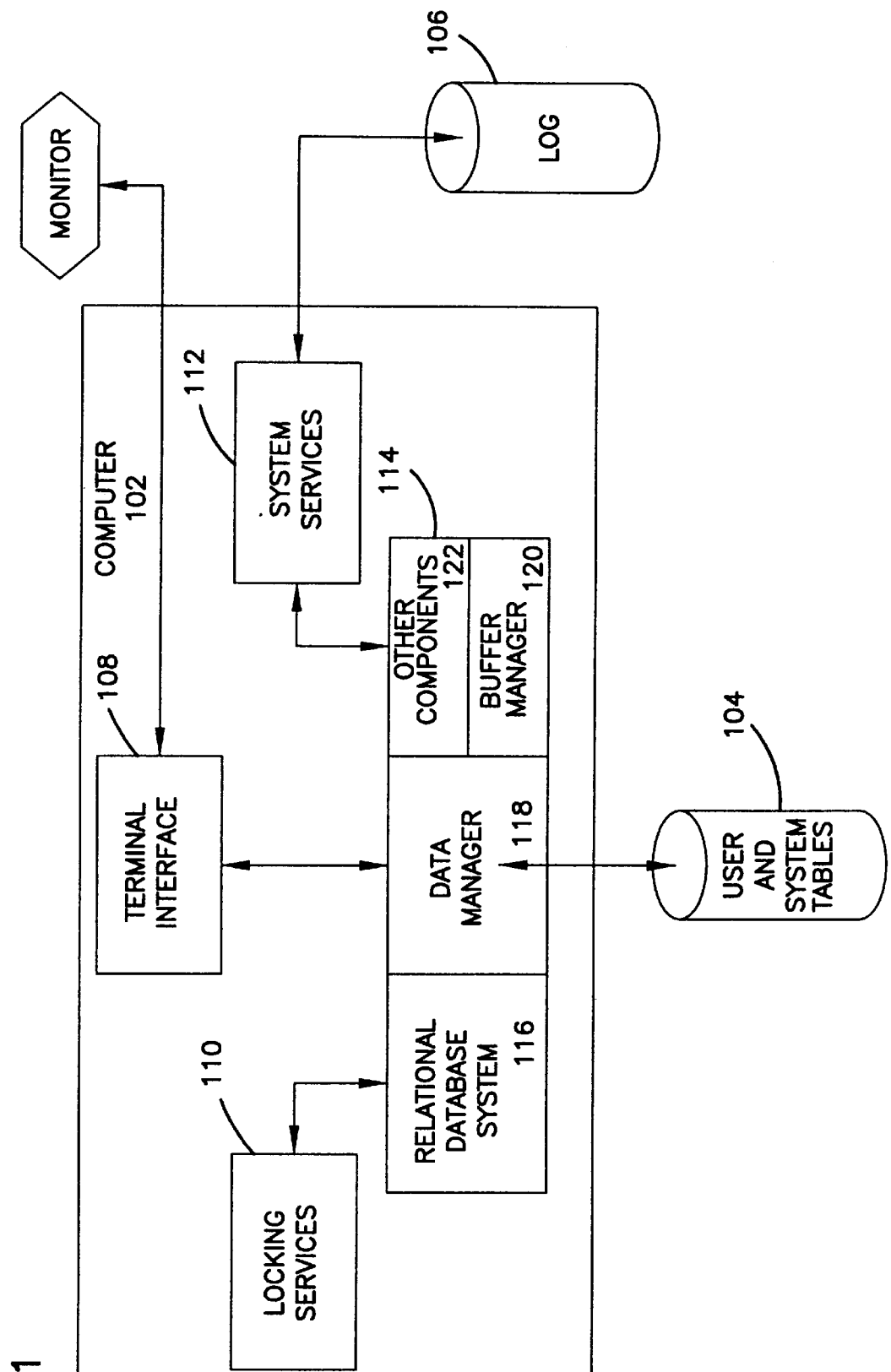
FIG. 1 illustrates the computer hardware environment of the present invention.

FIG. 1 illustrates an exemplary computer hardware environment that could be used with the present invention. In the exemplary environment, a computer system 102 is comprised of one or more processors connected to one or more electronic storage devices 104 and 106, such as disk drives, that store one or more databases.

Operators of the computer system 102 use a standard terminal interface 108, such as IMS/DB/DC, CICS, TSO, or other interface, to perform various search and retrieval functions, termed queries, against the databases, typically using Relational DataBase Management System (RDBMS) software that incorporates the Structured Query Language (SQL) standard. In the preferred embodiment of the present invention, the RDBMS software comprises the DB2 product offered by IBM for the MVS or OS/2 operating systems. Those skilled in the art will recognize, however, that the present invention has application to any RDBMS that uses SQL.

The DB2 architecture includes three major components: (1) the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

Figure 2:
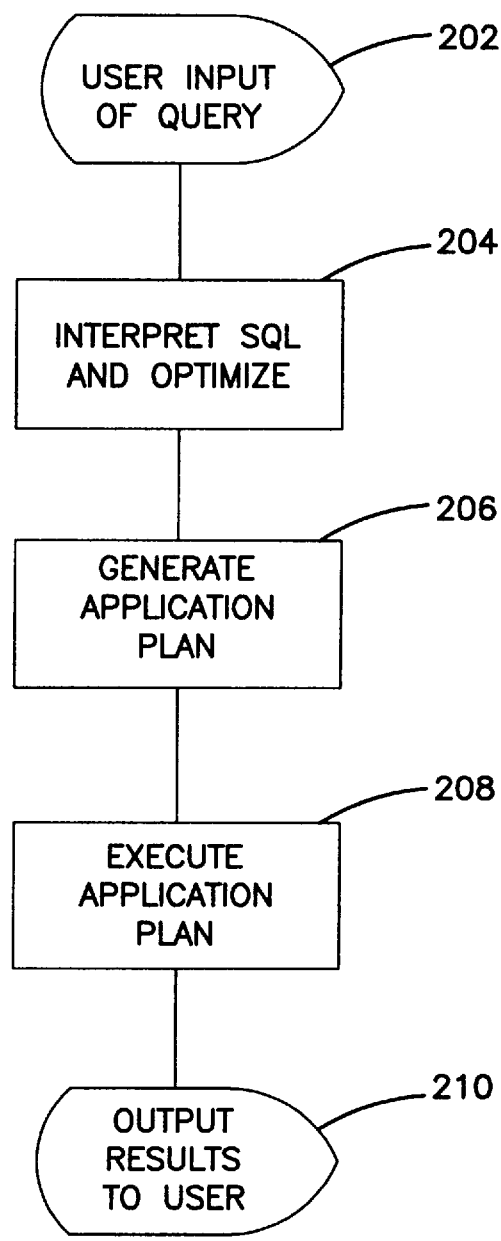
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer from the user. Block 204 represents the step of compiling or interpreting the SQL statements. An optimization function within block 204 may reorder the SQL query in a manner described in more detail later in this specification. Block 206 represents the step of generating a compiled set of runtime structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
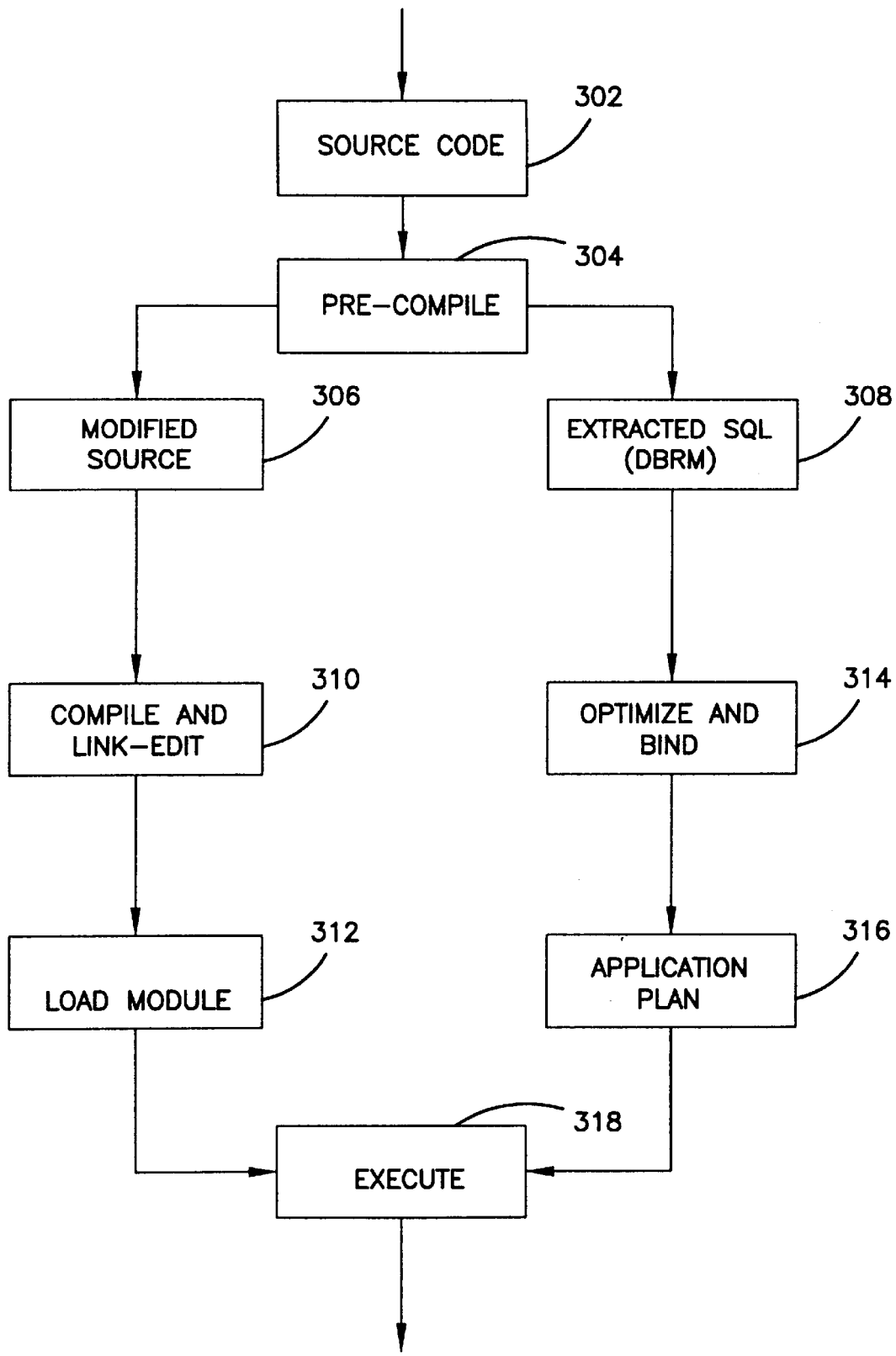
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

OPTIMIZATION

The method of optimizing SQL queries of the present invention eliminates the restrictive assumptions of the prior art, thus making it possible to perform comprehensive reorderings of complex queries containing joins and outer joins in SQL based commercial RDBMS products.

The prior art's first restrictive assumption of no duplicates in relations and second restrictive assumption that projection removes all duplicates are eliminated by the introduction of a novel binary operator, termed the Modified Generalized Outer Join (MGOJ). The MGOJ operator is sufficiently powerful to replace the Generalized Outer Join operator (GOJ) proposed in [GALI92b].

The prior art's third restrictive assumption that outer join predicates refer to exactly two relations is eliminated by the introduction of a new, simple, yet powerful concept of "precedence sets". This concept is easily integrated into query optimizers that use dynamic programming to enumerate the various reorderings for the query, like the commercial RDBMS products DM2 and DB2/CS V2 offered by IBM, the assignee of the present invention.

Finally, a note should be made regarding operator position. Since unary operators like selection and projection can appear anywhere in queries, binary join operators may not be adjacent to each other in a given user query. The results from [GALI92b] and as well results from testing by the inventors of the present invention require that the binary operators should be adjacent to each other. Methods exist to remove unary operators as shown by [GALI92b] and: Pirahesh, H., Hellerstein, J. M. and Hasan, W., "Extensible/rule based query rewrite optimization in Starburst", *SIGMOD*, pp. 39–48, San Diego, Calif., June 1992, (hereafter referred to as "[PIRA92]"). Henceforth, the present invention assumes that binary operators are adjacent to each other.

DEFINITIONS

Following are definitions for a number of terms used in SQL queries. These definitions are required for an understanding of later portions of the present specification.

Tuple

A tuple t is a mapping from a finite set of attributes, $R \cup V$, to a set of atomic (possibly null) values, where R is a non-empty set of real attributes and V is a non-empty set of virtual attributes, $R \cap V = \phi$, and the mapping t maps at least one virtual attribute $v \in V$ to a non-null value. For an attribute set X, t[X] represents the values associated with attributes X under the mapping t, where $X \subseteq R \cup V$ and $X \neq \phi$.

The motivation behind the distinction between real and virtual attributes is to emphasize the difference between the real attributes available for manipulation (to the user of the RDBMS) and the virtual attributes used (by the RDBMS) for bookkeeping only. The set of real attributes of a tuple is the same as the schema of the tuple in the traditional relational algebra. These attributes are accessible to users and can be referenced externally, e.g., in user queries, etc.

On the other hand, virtual attributes are (at times) used to provide unique conceptional tuple-ids to tuples, and are not accessible to users and cannot be referenced externally.

Relation

A relation r is a triple <R, V, E> where R is a non-empty set of real attributes, V is a non-empty set of virtual attributes, and E, the extension of relation r, is a set of tuples such that:

$$(\forall t_1 \epsilon E)(\forall t_2 \epsilon E)(t_1 \neq t_2 \Rightarrow t_1[V] \neq t_2[V])$$

In this definition, $R \cup V$ is called the schema of relation r.

Predicate

A predicate p over a set of real attributes sch(p) called the schema of p, is a total mapping from tuples to the Boolean values {TRUE, FALSE}, where sch(p) is the minimum set of attributes such that for all tuples $t_1$ and $t_2$:

$$(t_1[sch(p)] = t_2[sch(p)]) \Rightarrow p(t_1) = p(t_2)).$$

For a tuple t with real schema $R \supseteq sch(p)$, p(t) is TRUE if and only if ($\forall A \epsilon sch(p)$) (i.e., substitution of t[A] for A in p causes it to evaluate to TRUE).

Null-intolerant

A predicate p is null-intolerant if p evaluates to FALSE for tuples undefined on one or more attributes in sch(p). More formally, p is null-intolerant if:

$$(\forall t)(\exists A \epsilon sch(p))(t[A] = NULL \Rightarrow p(t) = FALSE)$$

Throughout the remainder of the present specification, it is assumed that all predicates are null-intolerant.

ALGEBRAIC OPERATORS

Following are definitions for algebraic operators used in SQL queries. These definitions are required for an understanding of later portions of the present specification.

Relations

Let $r = <R,V,E>$, $r_1 = <R_1,V_1,E_1>$ and $r_2 = <R_2,V_2,E_2>$ denote relations such that $R_1 \cup R_2 = \phi$ and $V_1 \cup V_2 = \phi$.

Projection

The projection, $\pi^a_X(r)$, of relation r onto attributes X is the relation $<X,V,E'>$ where $X \subseteq R$ and:

$$E' = \{t \cdot v | (\exists t' \epsilon E)(t = t'[X] \wedge v = t'[V])\}$$

The $\pi^a$ operator is a projection operator that does not remove "duplicates" in the real attributes part of the source expression. The superscript a in $\pi^a$ denotes the fact that all the virtual attributes of the source expression are included in the virtual schema of the result expression. For ease of reading, the superscript a is omitted from $\pi^a$ whenever there is no ambiguity, so it can be written simply as $\pi$.

The projection, $\pi^c_{X_R X_V}(r)$, of relation r on attributes $X_R X_V$ is the relation $<X_R,X_V,E'>$, where $X_R \subseteq R$, $X_V \subseteq V$ and:

$$E' = \{t \cdot v | (\exists t' \epsilon E)(t = t'[X_R] \wedge v = t'[X_v])\}$$

In contrast to $\pi$, $\pi^c$ allows a choice in the selection of the virtual attributes from the source expression. This operation is needed for defining the "Modified Generalized Outer Join" operator defined hereinafter.

Delta-Projection

The delta-projection, $\delta_{X_R X_V}(r)$, of relation r on attributes $X_R X_V$ is the relation $<X_R X_V, V_{new}, E'>$, where $X_R \subseteq R$, $X_V \subseteq V$, and:

$$E' = \{t | (\exists t' \epsilon E)(t[X_R X_V] = t'[X_R X_V] \wedge t[V_{new}]\}$$

which is a new, unique value. The $\delta$ operator models the "SELECT DISTINCT . . . " construct of SQL which allows elimination of "duplicates" from a relation. The δ operator is called the distinct projection operator and produces a result relation which has distinct values on the attributes $X_R X_V$ and a new virtual attribute. Note that the $X_V$ part of the tuple in the result expression is of theoretical importance mainly, and results in [BHAR94] discuss the optimal "realization" of virtual ids.

Selection

The selection, $\delta_p(r)$, of relation r on predicate p is the relation <R,V,E'>, where sch(p)⊆R, and:

$$E' = \{t|(t \in E) \land p(t)\}$$

Cross Product and Difference

The cross product, $r_1 \times r_2$, and difference, $r_1 - r_2$, of relations $r_1$ and $r_2$ are the relations <$R_1R_2$, $V_1V_2$, $E_1 \times E_2$> and <R, V, $E_1 - E_2$>, respectively.

Union and Outer Union

The union, $r_1 \cup r_2$, of relations $r_1$ and $r_2$ is the relation <R, V, $E_1 \cup E_2$>. The outer union, $$r_1 \uplus r_2,$$

is the relation <$R_1 \cup R_2$, $V_1 \cup V_2$, E'>, where:

$$E' = \{t|(\exists t' \in E_1)(t[R_1V_1] = t' \land (\forall A \in (R_2 - R_1) \cup (v_2 - v_1))(t[A] = \text{NULL}))$$
$$\land (\exists t'' \in E_2)(t[R_2V_2] = t'' \land (\forall A \in (R_1 - R_2) \cup (v_1 - v_2))(t[A] = \text{NULL}))\}$$

Note that rows in $$r_1 \uplus r_2$$

are padded with nulls for those attributes that are not present either in relation $r_1$ or in relation $r_2$.

Additional Algebraic Operators

In the following definitions, it is assumed that if predicate p is associated with join/outer/full outer join of relations $r_1$ and $r_2$ then $p = p_1 \land p_2 \land \ldots \land p_m$, where $p_i$ is a predicate such that $\text{sch}(p_i) \cap R_1 \neq \phi$ and $\text{sch}(p_i) \cap R_2 \neq \phi$, $1 \leq i \leq m$.

Join

The join, $$r_1 \underset{\bowtie}{p} r_2,$$

of relations $r_1$ and $r_2$ is the relation <$R_1R_2, V_1V_2, E'$>, where:

$$E' = \{t|t \in (E_1 \times E_2) \land p(t)\}$$

Anti-Join

The anti-join, $$r_1 \underset{\triangleright}{p} r_2,$$

of relations $r_1$ and $r_2$ is the relation <$R_1, V_1, E'$>, where:

$$E' = \left( E_1 - \pi^c_{R_1 V_1} \left( E_1 \underset{\bowtie}{p} E_2 \right) \right)$$

Left and Right Outer Joins

The left outer join, $$r_1 \underset{\rightarrow}{p} r_2,$$

is the relation <$R_1R_2, V_1V_2, E'$>, where:

$$E' = \left( E_1 \underset{\bowtie}{p} E_2 \right) \uplus \left( E_1 - \pi^c_{R_1 V_1} \left( E_1 \underset{\bowtie}{p} E_2 \right) \right)$$

Relation $r_1$ in the above definition is called the preserved relation and relation $r_2$ is called the null supplying relation. The right outer join, $$R_1 \underset{\leftarrow}{p} r_2,$$

can similarly be defined in which $r_1$ is the null supplying relation and $r_2$ is the preserved relation.

Full Outer join

The full outer join, $$r_1 \underset{\leftrightarrow}{p} r_2,$$

of relations $r_1$ and $r_2$ is the relation <$R_1R_2, V_1V_2, E'$>, where:

$$E' = \left( E_1 \underset{\bowtie}{p} E_2 \right) \uplus \left( E_1 - \pi^c_{R_1 V_1} \left( E_1 \underset{\bowtie}{p} E_2 \right) \right) \uplus \left( E_2 - \pi^c_{R_2 V_2} \left( E_1 \underset{\bowtie}{p} E_2 \right) \right)$$

EXPRESSION AND EXPRESSION TREES

The following provides a recursive definition of expressions.

1. If r=<R, V, E> is a relation, then r is an expression. Henceforth, the shorthand notation X will be used to represent the expression X=<$R_x, V_x, E_x$>,
2. If X=<$R_x, V_x, E_x$> is an expression, then $\pi^a_{x'}(e)$ is an expression, where $X' \subseteq R_x$.
3. If X=<$R_x, V_x, E_x$> is an expression, then $\delta_{X_R X_V}(e)$ is an expression, where $X_R \subseteq R_x$ and $X_v \subseteq V_x$.
4. If X=<$R_x, V_x, E_x$> is an expression, then $\sigma_p(X)$ is an expression, where sch(p)⊂$R_x$.
5. If X=<$R_x, V_x, E_x$> and Y=<$R_y, V_y, E_y$> are expressions, then $$X \underset{\circ}{p} Y$$

is an expression, where:

$$p \in \left\{ \underset{\rightarrow}{\overset{p}{\bowtie}}, \underset{\leftarrow}{\overset{p}{\rightharpoonup}}, \underset{\leftarrow}{\overset{p}{\leftharpoonup}}, \underset{\rightarrow}{\overset{p}{\rightharpoonup}}, MGOJ[p, X', Y'] \right\}$$

and p is a predicate such that $sch(p) \cap R_x \neq \phi$ and $sch(p) \cap R_y \neq \phi$. Note that MGOJ [p, X', Y'], which is defined further hereinafter, does not appear in user expressions and is generated only by the optimizer in the preferred embodiment of the present invention.

6. If $X = <R_x, V_x, E_x>$ is an expression, then so is (X), where $(X) = <R_x, V_x, E_x>$. This is termed parenthesization, and is required due to the fact that some of the binary operations defined above are not fully associative. Parenthesization determines the evaluation order so that expressions can be evaluated unambiguously. However, whenever there is no ambiguity, parentheses will be dropped freely.

An expression can also be represented by a corresponding expression tree in which the inner nodes are the operators occurring in the expression and the leaves are the base relations referenced in the expression. Let $\overset{p}{\bowtie}$ denote one of the binary operators defined in the previous section, then an expression tree T with left sub-tree $T_l$, right sub-tree $T_r$ and root $\overset{p}{\bowtie}$ is denoted by:

$$(T_l \overset{p}{\bowtie} T_r)$$

Henceforth, the two equivalent representations are used interchangeably.

Those skilled in the art will recognize thae application of methods claimed in this application to a layer class of expressions supported by SQL.

HYPERGRAPHS AND ASSOCIATION TREES

A query is represented by hypergraph, defined as follows.
Hypergraph

A hypergraph G is defined to be the pair <V,E>, where V is a non-empty set of nodes and E is the set of hyperedges, such that E is a mapping on non-empty subsets of V (i.e., $E: 2^V \rightarrow 2^V$)

As a notational convenience, for hyperedge $e=(V_1,V_2) \in E$, where $V_1, V_2 \in 2^V$. $V_1$ is referred to as sourceHypernode(e) and $V_2$ is referred to as destHypernode(e). Further, whenever there is no distinction required between $V_1$ and $V_2$, then they are simply called hypernodes. If $|V_1|=|V_2|=1$, hyperedge e is referred to as simply an edge and the hypernodes $V_1$ and $V_2$ as simply nodes.

A hypergraph is used to represent a query, where the set of nodes of the hypergraph correspond to relations referenced in the query, and edge represents a join (inner, one-sided outer, or full outer) operation involving a predicate between the 2 nodes of the edge, and a hyperedge represents an outer join (full or one-sided) between the sets of relations in its sourcehypernode and destHypernode. To clarify, edges correspond to predicates involving exactly two relations, whereas hyperedges correspond to outer join operations involving predicates that reference more than 2 relations.

Path

A path in a hypergraph $G=<V,E>$ from node $v_1$ to node $v_n$ is an alternating sequence of nodes and edges, $v_1 e_1 \ldots V_i e_i \ldots e_{n-1} V_n$ such that:

1. $V_j \in V$ for $1 \leq j \leq n$ and $e_k \in E$ for $1 \leq k \leq (n-1)$.
2. $v_i \neq v_j$ for $1 \leq i, j \leq n$ and $i \neq j$.
3. $e_j \neq e_k$ for $1 \leq j, k \leq (n-1)$ and $j \neq k$.
4. Either $v_j \in sourceHypernode(e_j)$ and $v_{j+1} \in destHypernode(e_j)$, or $v_j \in destHypernode(e_j)$ and $v_{j+1} \in sourceHypernode(e_j)$, for $1 \leq j \leq (n-1)$ $v_1$ is called the starting node of the path and $v_n$ the ending node of the path.

Directed and Bi-directed (Hyper)edges

A (hyper)edge is directed if it represents a one-sided outer join operation in the query. Further, a (hyper)edge is bi-directed if it represents a full outer join operation in the query.

Induced Subgraph

A hypergraph $G'=<V',E'>$ is an induced subgraph of graph $G=<V,E>$ if $V' \subseteq V$, $E' \subseteq E$ and:

$$E' = \{e | e = <V_1, V_2> \in E, V_1 \subseteq V', V_2 \subseteq V'\}$$

An induced subgraph $G'=<V',E'>$ of G is denoted by $G|_{V'}$.

Association Tree

For a query hypergraph $G=<V,E>$, an association tree T is defined for G as a binary tree such that:

1. leaves(T), and no relation appears in more than one leaf.
2. For any sub-tree T' of T, $G|_{leaves(T')}$ is connected where $G|_{leaves(T')}$ is the induced subgraph of G.
3. For any sub-tree $T'=(T_1' \cdot T_r')$ of T, let $E_{T'}$ denote the set of all edges in E that connect leaves of $T_1'$ with leaves of $T_r'$, then either $V_1 \subseteq leaves(T_1')$ and $V_2 \subseteq leaves(T_r')$ or $V_2 \subseteq leaves(T_1')$ and $V_1 \subseteq leaves(T_r')$.

MODIFIED GENERALIZED OUTER JOIN

In this section, the novel Modified Generalized Outer Join (MGOJ) operator is presented, which is used to reorder complex queries. Next, the procedures ASSOCIATION TREE, CONFLICT-FREE OPERATOR ASSIGNMENT and GENERAL OPERATOR ASSIGNMENT are presented that generate the optimal plan for a given query.

Consider the query:

$$Q_1 = X_1 \underset{\rightarrow}{\overset{p_{1,2}}{\rightharpoonup}} \left( X_2 \underset{\bowtie}{\overset{p_{2,3}}{\bowtie}} X_3 \right)$$

If only joins, outer and full outer joins are employed, then this query can only be executed in the manner in which it is specified. To re-order this query and other similar queries, the Generalized Outer Join (GOJ) operator was introduced in the publication: Dayal, Umeshwar, "Of nests and trees: A unified approach to processing queries that contain nested subqueries, aggregates, and quantifiers", *VLDB*, pp. 197–208, 1987 (hereinafter referred to as "[DAYA87]").

The GOJ of relation $X_1$ by relation $X_2$ preserving $X_3$, where $X_3 \subseteq X_1$, is equal to:

$$\left( X_1 \overset{p_{1,2}}{\bowtie} X_2 \right) \uplus \delta_{X_3} \left( X_1 - \pi_{X_1} \left( X_1 \overset{p_{1,2}}{\bowtie} X_2 \right) \right)$$

The publication [GALI92a] identified a small error in this operator and modified it to:

$$\left( X_1 \overset{p_{1,2}}{\bowtie} X_2 \right) \uplus \left( \delta_{X_3}(X_1) - \delta_{X_3} \left( X_1 \overset{p_{1,2}}{\bowtie} X_2 \right) \right)$$

Since both these operators remove duplicates in the anti-join part, they cannot be used in the presence of duplicates. The present invention provides a new operator, the Modified Generalized Outer Join (MGOJ), that can handle duplicates in the relations.

In the following definition, let $r_1 = <R_1, V_1, E_1>$ and $r_2 = <R_2, V2, E_2>$ be two relations such that $R_1 \cap R_2 = \phi$ and $V_1 \cap V_2 = \phi$. Further, let $X_i = <R_{x_i}, V_{x_i}, E_{x_i}>$, $1 \leq i \leq n$, and $Y_j = <R_{y_j}, V_{y_j}, E_{y_j}>$, $1 \leq j \leq n'$, be relations such that $R_{x_i} \cap R_{x_k} = V_{x_i} \cap V_{x_k} = \phi$. $R_{y_j} \cap R_{y_s} = V_{y_j} \cap V_{y_s} = \phi$, $R_{x_i} \subseteq R_1$ and $R_{y_j} \subseteq R_2$, where $i \neq k$, $j \neq s$, $1 \leq i, k \leq n$ and $1 \leq j, s \leq n'$.

The MGOJ operator, which is expressed in the form:

$$r_1 MGOJ[p, X_1, \ldots, X_n, Y_1, \ldots, Y_{n'}] r_2$$

of relations $r_1$ and $r_2$ while preserving relations $X_i$ and $Y_j$ is the relation $<R_1 R_2, V_1 V_2, E'>$, where $1 \leq i \leq n$, $1 \leq j \leq n'$ and $E'$ is given by:

$$E' = \left( r_1 \overset{p}{\bowtie} r_2 \right) \uplus_{i=1}^{n} \left\{ t | t \in \left( \pi^c_{X_i V_{xi}}(E_1) - \pi^c_{X_i V_{x_i}}\left( E_1 \overset{p}{\bowtie} E_2 \right) \right) \right\}$$

$$\uplus_{j=1}^{n'} \left\{ t | t \in \left( \pi^c_{Y_j V_{yj}}(E_2) - \pi^c_{Y_j V_{y_j}}\left( E_1 \overset{p}{\bowtie} E_2 \right) \right) \right\}$$

In the preferred embodiment, the MGOJ operator is available only to the optimizer during re-ordering of binary operations and cannot appear in user queries. However, those skilled in the art will recognize that such an operator could, in fact, become part of the SQL interface available to users.

GENERATION OF THE OPTIMAL QUERY

Figure 4:
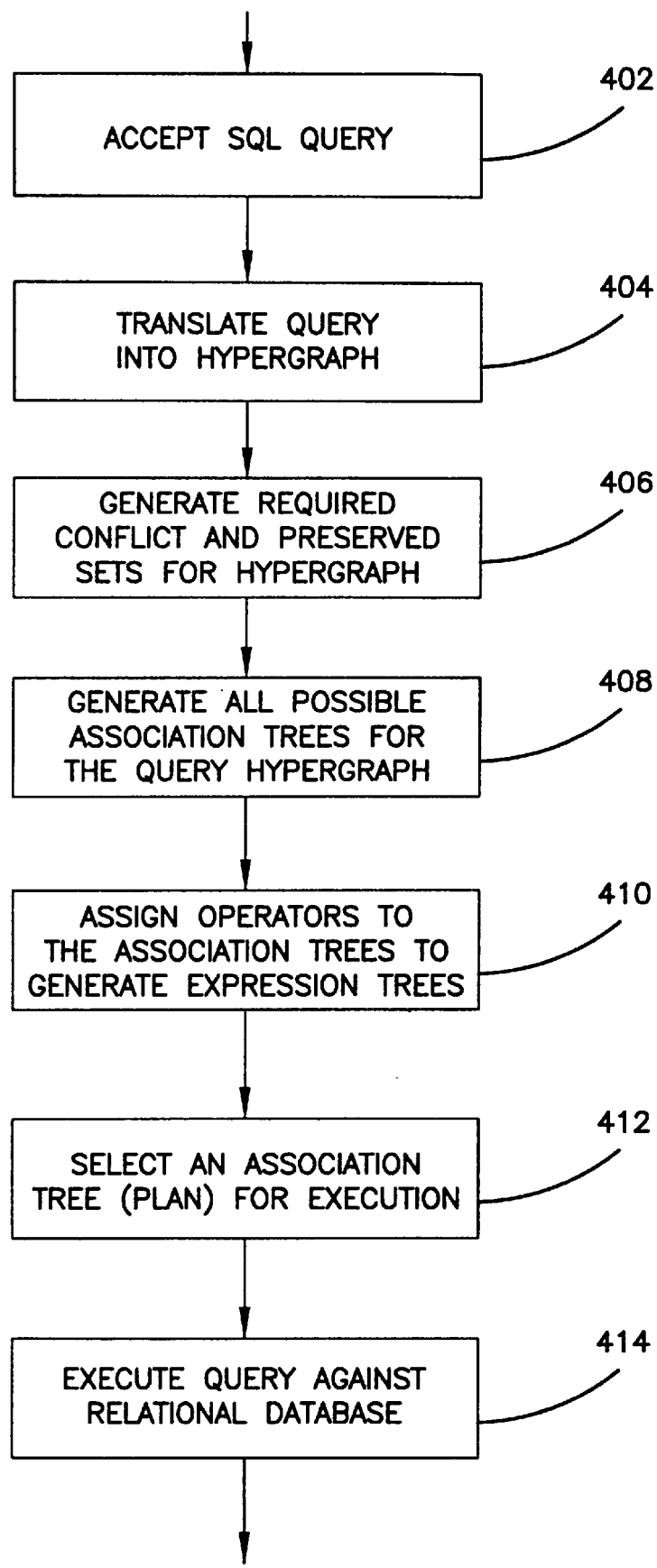
FIG. 4 is a flowchart illustrating the method of optimizing SQL queries of the present invention, wherein an optimal plan or schedule is generated for a given SQL query that may contain complex predicates and may reference relations containing duplicates.

FIG. 4 is a flowchart illustrating the method of optimizing SQL queries of the present invention, wherein an optimal plan or schedule is generated for a given SQL query that may contain complex predicates and may reference relations containing duplicates. Block 402 represents the acceptance of the SQL query (either interactively from the user or extracted from program source code). Block 404 represents the translation of the query into a hypergraph. Block 406 represents the generation of the required sets, conflict sets, and preserved sets for the hypergraph. Block 408 represents the generation of all possible association trees for the query hypergraph. Block 410 represents the assignment of operators to the association trees to generate expression trees. Block 412 represents the selection of an optimal association tree (plan) for execution. Block 414 represents the execution of the reordered query against the relational database and the output of the results of the query to the user.

In the above method, the required sets and the conflict sets are generated independently of each other. Moreover, the association trees or plans and the conflict sets are also generated and enumerated independently of each other. Typically, however, the required sets and conflict sets are generated before the association trees or plans are enumerated. Moreover, the required sets, plans, and conflict sets are generated, enumerated, and generated before the operators are assigned.

HYPERGRAPH TRANSLATION

Figure 5:
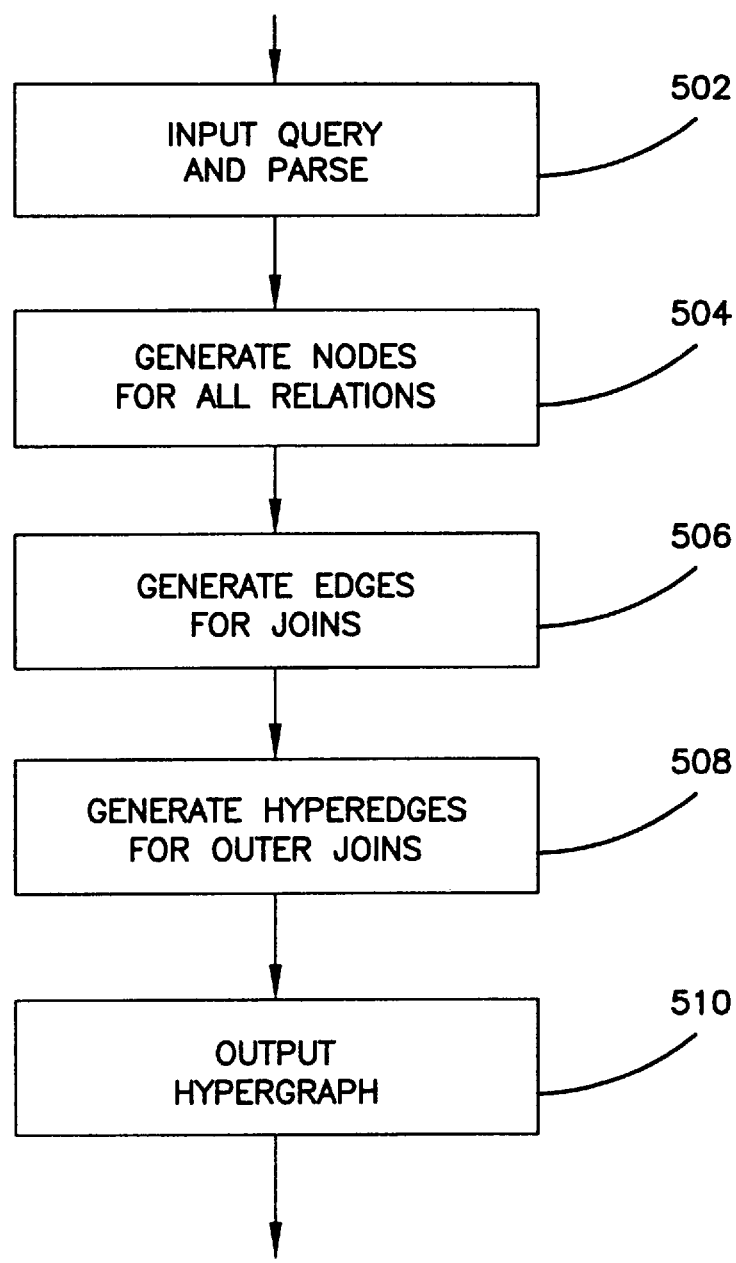
FIG. 5 is a flowchart illustrating the method of translating SQL queries into hypergraphs according to the present invention.

FIG. 5 is a flowchart illustrating the method of translating SQL queries into hypergraphs according to the present invention. Block 502 represents the input of the SQL query and the parsing of the query into its component parts. Block 504 represents the generation of a set of nodes corresponding to relations referenced in the query. Block 506 represents the generation of edges for all joins in the query, wherein each edge is generated between two of the nodes corresponding to a join operation involving a predicate between the two nodes. Block 506 also identifies an edge as being directed when it represents a one-sided outer join operation in the query. In addition, block 506 identifies an edge as being bi-directed when it represents a full outer join operation in the query. Block 508 represents the generation of hyperedges for all outer joins in the query, wherein each hyperedge is generated between two of the nodes corresponding to a left outer join, a right outer join, or a full outer join operation involving a predicate that references a plurality of relations in the query. Block 508 also identifies a hyperedge as being directed when it represents a one-sided outer join operation in the query. In addition, block 508 identifies a hyperedge as being bi-directed when it represents a full outer join operation in the query. Block 510 represents the output of the hypergraph for further processing.

GENERATION OF REQUIRED SETS

Figure 6:
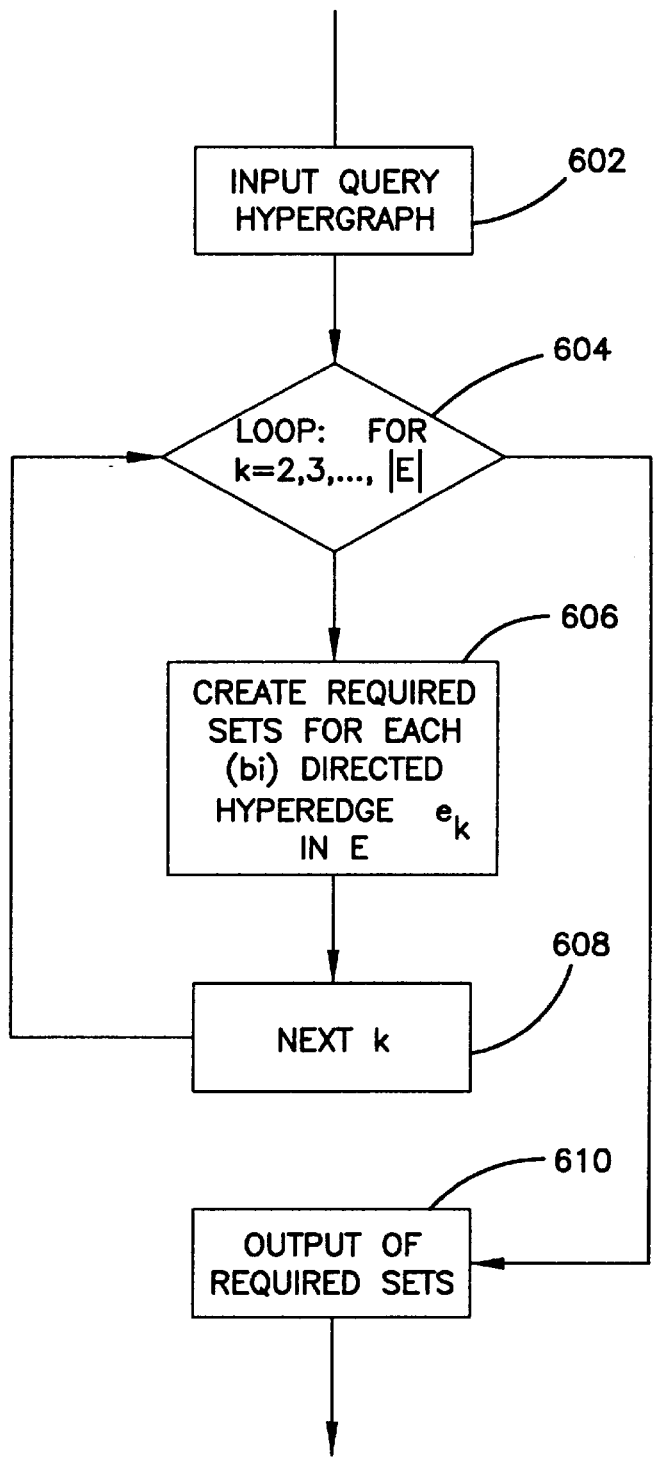
FIG. 6 is a flowchart illustrating the method of generating required sets for SQL queries according to the present invention.

FIG. 6 is a flowchart illustrating the method of generating required sets for SQL queries according to the present invention. This procedure enumerates all the required sets (p) that identify constraints on associative re-orderings of the relations in the query Q. Required sets are generated only for left, right, and full outer joins.

This procedure uses the following notation:

$T = T_1 \cdot T_r$ is an association tree of $G_{leaves(T)}$, wherein $T_1$ is a left sub-tree of T and $T_r$ is a right sub-tree of T.

$E_T$ is a set of (hyper)edges in G that connects leaves of $T_1$ with leaves of $T_r$. e is an (hyper)edge in $E_T$.

Block 602 represents the input of the query hypergraph. Blocks 604–608 together form a loop that increments $k = 2, 3, \ldots, |E|$. Block 606 represents the creation of a required set for every (bi)directed hyperedge $e_k$ in E, wherein the required set (p) comprises $\{V_1, V_r\}$, sch(p) is a set of real attributes, $V_1 = \text{sch}(p) \cap T_1$, and $V_r = \text{sch}(p) \cap T_r$, so that the required set (p) contains relations that must be in $T_1$ and $T_r$ before $T_1$ and $T_r$ can be combined. Block 608 represents the increment to the next k in the loop. Once the loop is completed, block 610 represents the output of the required sets.

GENERATION OF CONFLICT SETS

Figure 7:
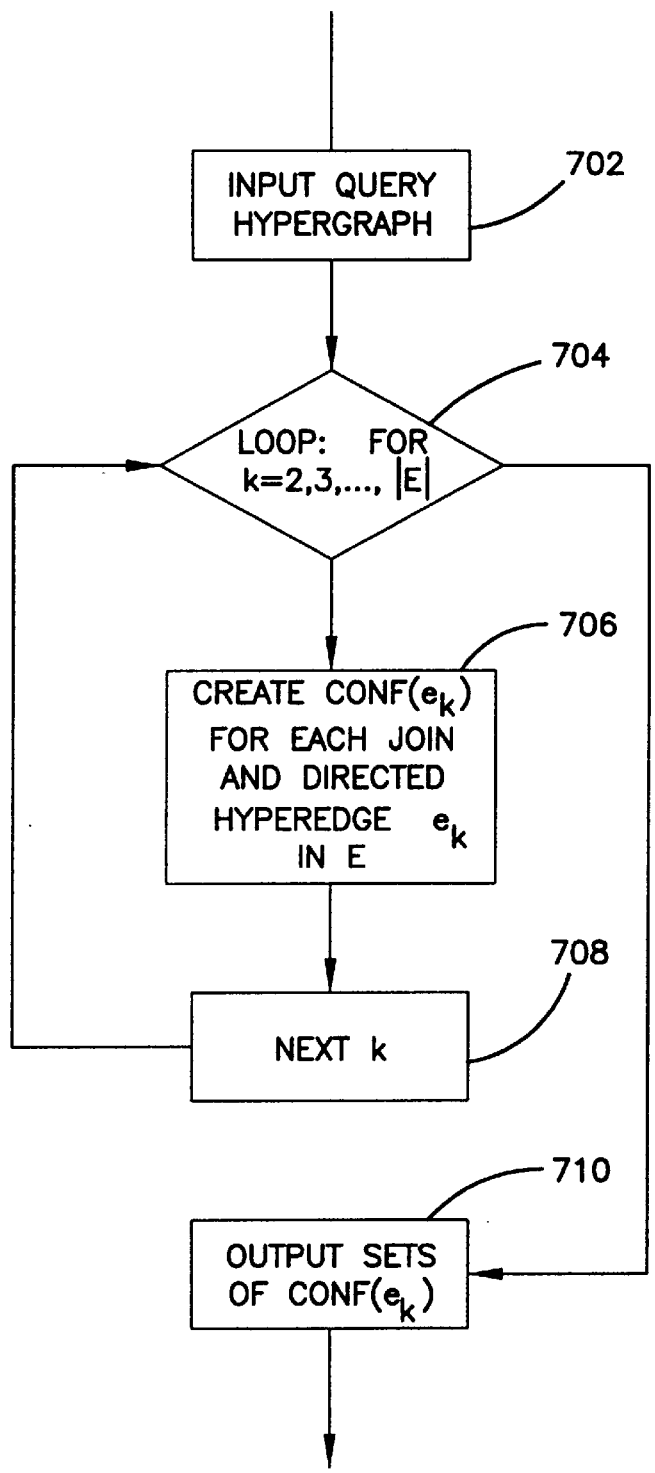
FIG. 7 is a flowchart illustrating the method of generating conflict sets for SQL queries according to the present invention.

FIG. 7 is a flowchart illustrating the method of generating conflict sets for SQL queries according to the present invention. An association tree specifies an order in which relations are to be combined, but does not provide operators to apply at each step. In order to specify the operators, conflict sets are required for join and directed outer join (hyper)edges. Conflict sets are computed once from the query hypergraph and then are used for all association trees.

Block 702 represents the input of the query hypergraph. Blocks 704–708 together form a loop that increments $k = 2, 3, \ldots, |E|$. Block 706 represents that, for each k, $\text{conf}(e_k)$ is created for each join and directed hyperedge $e_k$ in E. For a join edge $e_k$, the set of closest conflicting outer join, denoted $\text{ccoj}(e_k)$, is defined as follows:

$$\text{ccoj}(e_k) = \left\{ e | R_k \overset{e}{\rightarrow} R_1 \overset{e_2}{\bowtie} \ldots \overset{e_n}{\bowtie} R_i \overset{e_o}{\bowtie} R_j \text{ is a path in } G \right\}$$

There can be at most one closest conflicting outer join (hyper)edge in $\text{ccoj}(e_k)$. Also, if removing a set of join edges $e_0, e_1, \ldots, e_n$ from G disconnects G into two connected graphs, then all these join edges have the same closest conflicting outer join (hyper)edge.

The set of conflicting (hyper)edges of undirected or directed (hyper)edge, $e_k$, is denoted by $\text{conf}(e_k)$. If $e_k$ is directed, then the conflict set is defined as:

$$\text{conf}(e_k) = \left\{ e | R_i \overset{e_o}{\underset{\rightarrow}{\phantom{x}}} R_j \overset{e_1}{\underset{\sim}{\phantom{x}}} \ldots \overset{e_n}{\underset{\sim}{\phantom{x}}} R_k \overset{e}{\underset{\leftrightarrow}{\phantom{x}}} R_1 \text{ is a path in } G \right\}$$

If $e_k$ is undirected and $\text{ccoj}(e_k) = \phi$, then the conflict set is defined as:

$$\text{conf}(e_k) = \left\{ e | R_i \overset{e_o}{\underset{\bowtie}{\phantom{x}}} R_j \overset{e_1}{\underset{\sim}{\phantom{x}}} \ldots \overset{e_n}{\underset{\sim}{\phantom{x}}} R_k \overset{e}{\underset{\leftrightarrow}{\phantom{x}}} R_1 \text{ is a path in } G \right\}$$

If $e_k$ is undirected and $\text{ccoj}(e_k) = \{e\}$, then the conflict set is defined as:

$$\text{conf}(e_k) = \{e\} \cup \text{conf}(e_k)$$

In the above identities, $$e_i \atop \sim$$

is a join edge or a left/right outer join (hyper)edge.

Intuitively, if (hyper)edge $e_1$ belongs to $\text{conf}(e_k)$ then the operator corresponding to $e_1$ cannot be a descendant of the operator for $e_k$ without using the MGOJ operator.

Block 708 represents the increment to the next k in the loop. Once the loop is completed, block 710 represents the output of the conflict sets $\text{conf}(e_k)$.

GENERATION OF PRESERVED SETS

Figure 8:
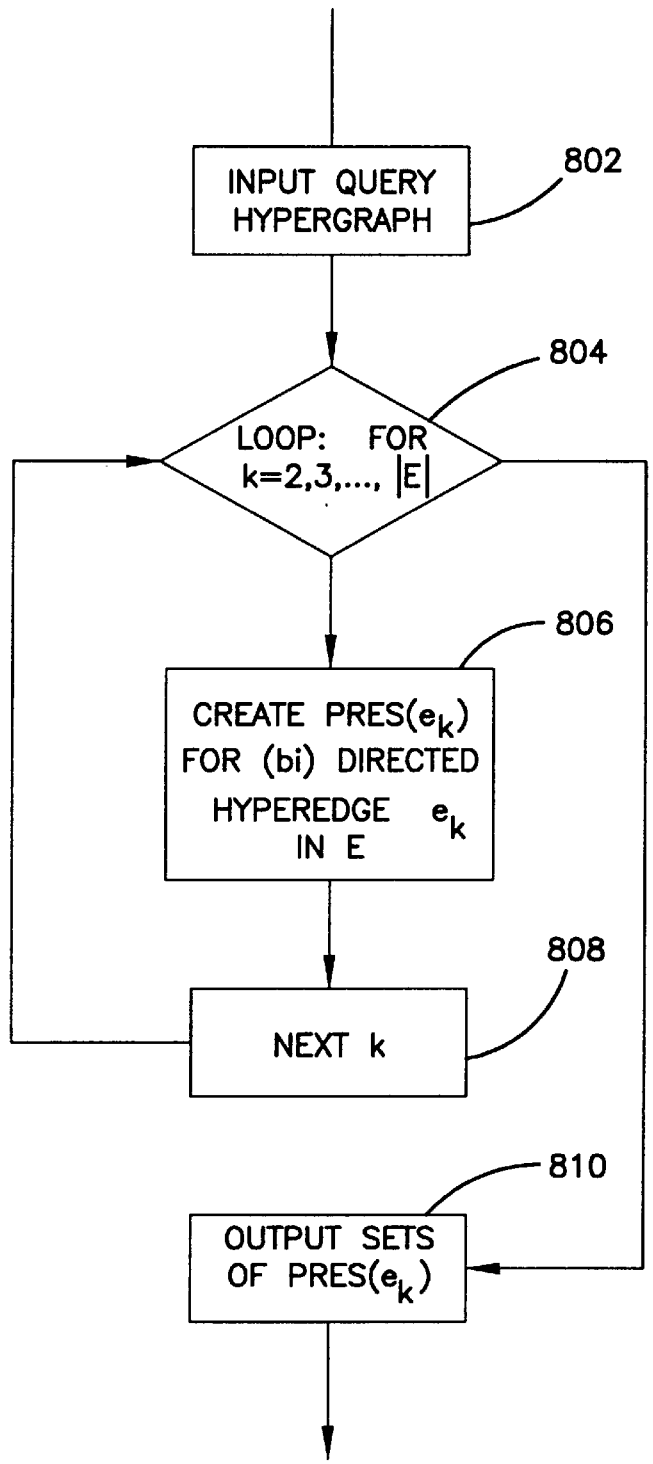
FIG. 8 is a flowchart illustrating the method of generating preserved sets for SQL queries according to the present invention.

FIG. 8 is a flowchart illustrating the method of generating preserved sets for SQL queries according to the present invention. As indicated above, an association tree specifies an order in which relations are to be combined, but does not provide operators to apply at each step. In order to specify the operators, preserved sets are required for directed and bi-directed (hyper)edges. Like conflict sets, preserved sets are computed once from the query hypergraph and then are used for all association trees.

Block 802 represents the input of the query hypergraph. Blocks 804–808 together form a loop that increments k=2, 3, . . . ,|E|. Block 806 represents that, for each k, the preserved set $\text{pres}(e_k)$ is created for each (bi)directed hyperedge $e_k$ in E.

In generating the preserved set $\text{pres}(e_k)$, the preserved relations are identified. These preserved relations comprise the contents of the preserved sets $\text{pres}(e_k)$. In a left outer join, $$r_1 \overset{p}{\underset{\rightarrow}{\phantom{x}}} r_2,$$

which is the relation $<R_1 R_2, V_1 V_2, E'>$, where:

$$E' = \left( E_1 \overset{p}{\underset{\bowtie}{\phantom{x}}} E_2 \right) \uplus \left( E_1 - \pi^c_{R_1 V_1} \left( E_1 \overset{p}{\underset{\bowtie}{\phantom{x}}} E_2 \right) \right)$$

relation $r_1$ is the preserved relation and relation $r_2$ is the null supplying relation. A right outer join, $$r_1 \overset{p}{\underset{\leftarrow}{\phantom{x}}} r_2,$$

can similarly be defined, wherein $r_1$ is the null supplying relation and $r_2$ is the preserved relation. In a full outer join, $$r_1 \overset{p}{\underset{\leftrightarrow}{\phantom{x}}} r_2,$$

both $r_1$ and $r_2$ are considered the null supplying and preserved relations.

If a directed (hyper)edge $e_o = V_i \rightarrow V_j$, is removed from hypergraph G, then G partitions into two connected hypergraphs, e.g., $G_1$ containing $V_i$ and $G_2$ containing $V_j$. The set of preserved attributes of $e_o$, denoted by $\text{pres}(e_o)$, is the union of attributes of relations in $G_1$. Similarly, let $e_1$ be a (hyper)edge in graph G. If (hyper)edge $e_o = (V_i \leftarrow \rightarrow V_j)$ is removed from hypergraph G, then G partitions into two connected hypergraphs, e.g., $G_1$ containing $e_1$ and $G_2$ not containing $e_1$. The set of preserved attributes of $e_o$ with respect to $e_1$, denoted $\text{pres}_{e_1}(e_o)$, is the union of attributes in $G_2$. If $e_o$ is a directed (hyper)edge, then $\text{pres}_{e_1}(e_o)$ is $(e_o)$ Block 808 represents the increment to the next k in the loop. Once the loop is completed, block 810 represents the output of the preserved sets.

GENERATION OF ASSOCIATION TREES

Figure 9:
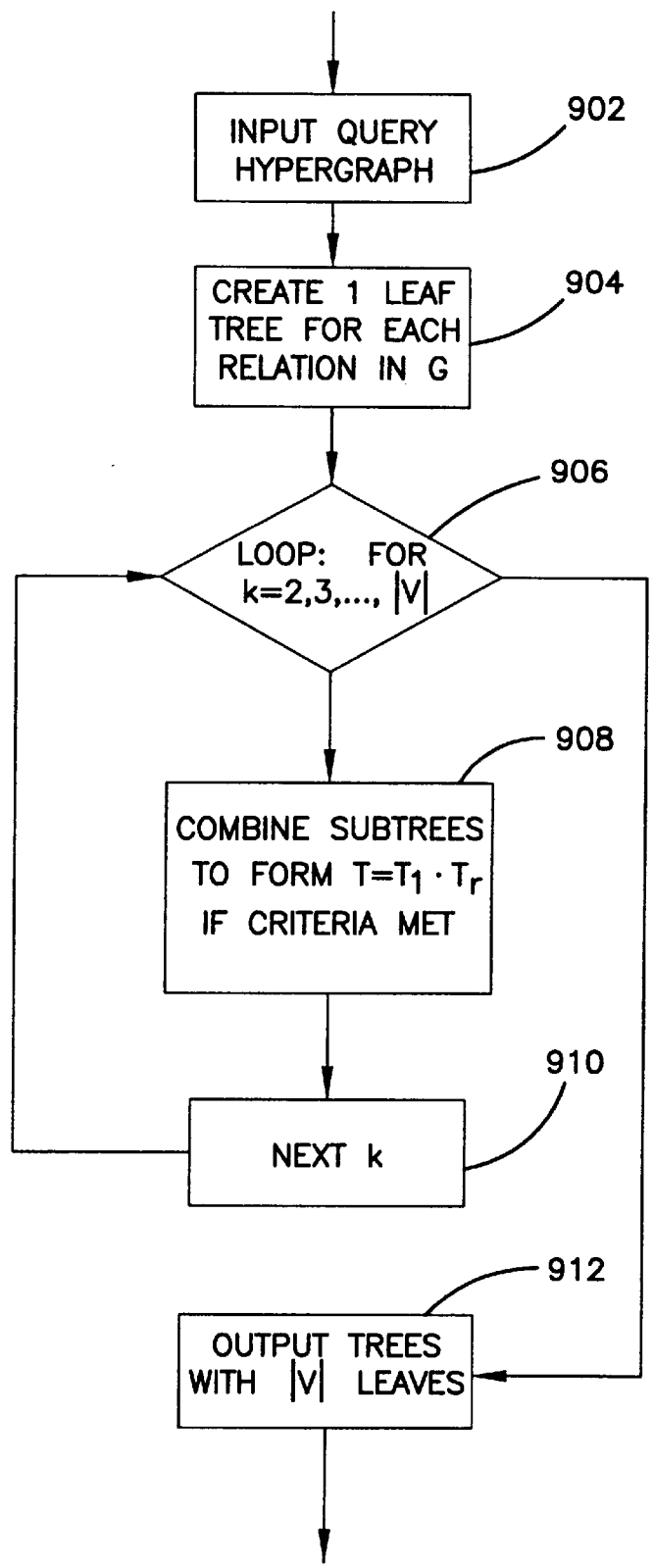
FIG. 9 is a flowchart illustrating the method of generating association trees for SQL queries according to the present invention.

FIG. 9 is a flowchart illustrating the method of generating association trees for SQL queries according to the present invention. This procedure enumerates all the possible association trees for a given query, wherein the association trees are constructed bottom up, incrementally, from the given query hypergraph. At each step, two sub-trees are combined to obtain a larger tree. Two sub-trees are combined only if all the conditions specified in the definition of association tree are satisfied. Although not mentioned here, dynamic programming can be used to prune the space of alternatives.

This procedure uses the following notation:

$T = T_1 \cdot T_r$ is an association tree of $G_{leaves(T)}$, wherein $T_1$ is a left sub-tree of T and $T_r$ is a right sub-tree of T.

$E_T$ is a set of (hyper)edges in G that connects leaves of $T_1$ with leaves of $T_r$.

e is an (hyper)edge in $E_T$.

Block 902 represents the input of the query hypergraph G=(V,E) and the required sets for the query. Block 904 represents the creation of a one leaf tree for each relation referenced in G. Blocks 906–910 together form a loop that increments k=2,3, . . . ,|V|. Block 908 represents that, for each k, sub-trees $T_1$ and $T_r$ are combined to form $T = T_1 \cdot T_r$ provided the following criteria are met:

1. $\text{leaves}(T_1) \cap \text{leaves}(T_r) = \phi$
2. $|\text{leaves}(T_1)| + |\text{leaves}(T_r)| = k$
3. $G|_{leaves(T_1) \cup leaves(T_r)}$ is connected.
4. $\forall e = <V_1, V_2> \in E_T$, either $V_1 \subseteq \text{leaves}(T_1)$ and $V_2 \subseteq \text{leaves}(T_r)$, or $V_2 \subseteq \text{leaves}(T_1)$ and $V_1 \subseteq \text{leaves}(T_r)$.

Block 910 represents the increment to the next k in the loop. Once the loop is completed, block 912 represents the output of those trees having |V| leaves, i.e., all possible association trees for G.

CONFLICT-FREE OPERATOR ASSIGNMENT

Figure 10A:
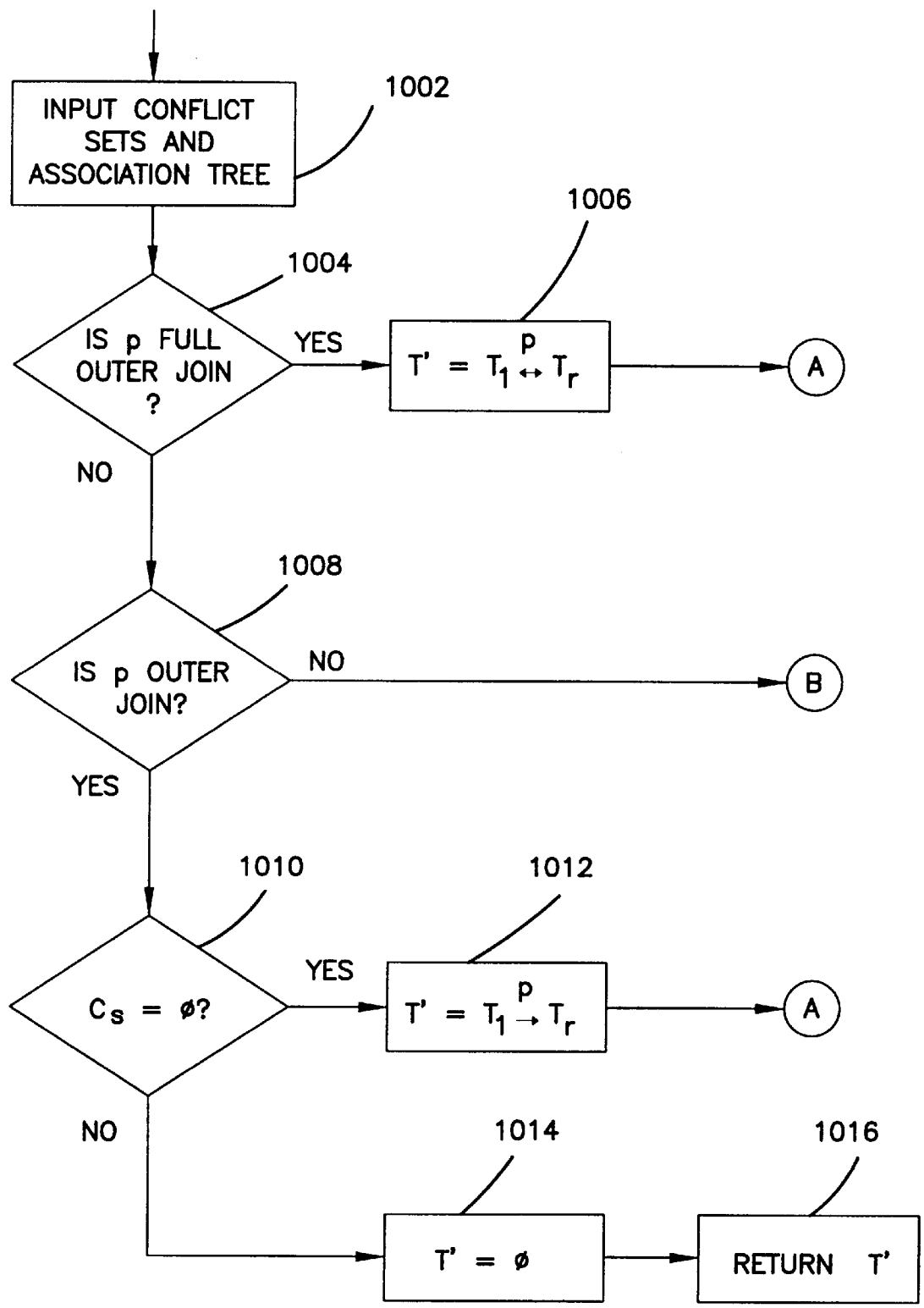
FIGS. 10A, 10B, and 10C together are a flowchart illustrating the method of performing conflict-free operator assignments for the association trees according to the present invention.
Figure 10B:
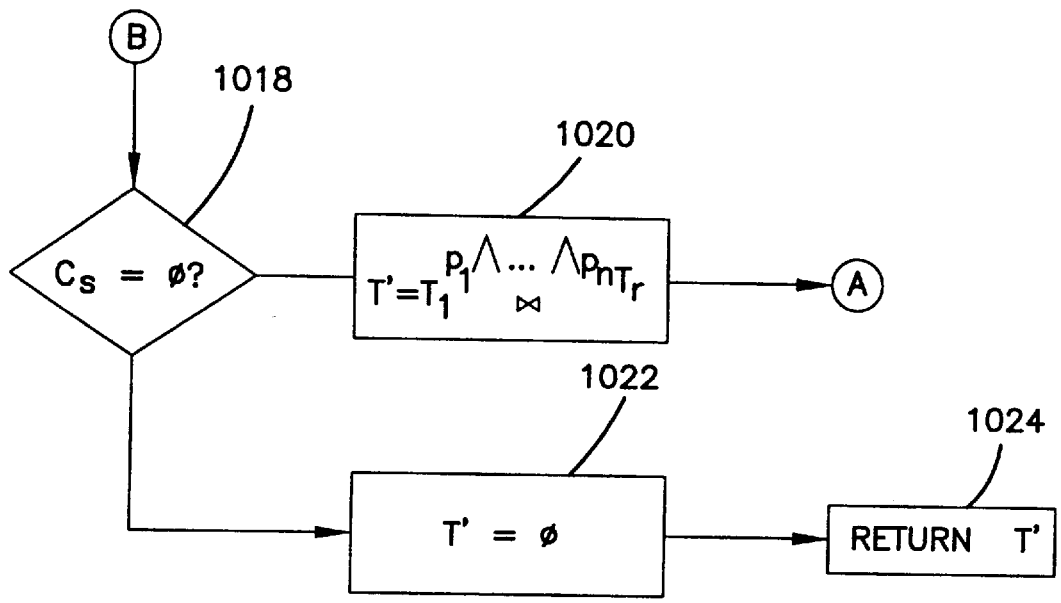
Figure 10C:
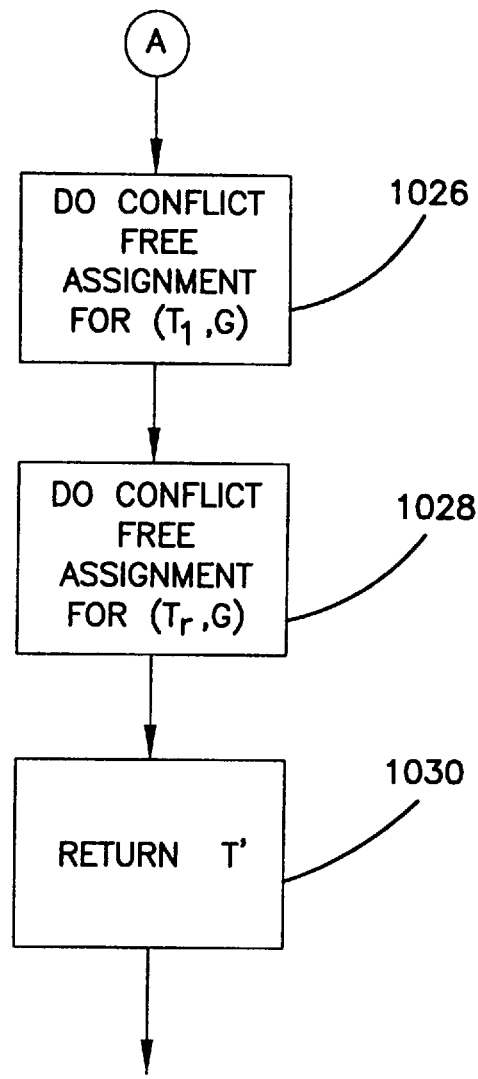

FIGS. 10A, 10B, and 10C together are a flowchart illustrating the method of performing conflict-free operator assignments for the association trees according to the present invention. The conflict-free operator assignment attempts to generate an operator tree for a given association tree by assigning joins, outer joins and full outer joins to the interior nodes of the association tree. If it is not possible to generate an operator tree without using the MGOJ operator, then an empty operator tree is returned.

This procedure uses the following notation:

$T=T_l \cdot T_r$, wherein $T_l$ is a left sub-tree of T and $T_r$ is a right sub-tree of T.

$T=T_l \odot T_r$, wherein $\odot$ is the operator selected as the root of T.

$E_T$ is the set of (hyper)edges in G that connects leaves of $T_l$ with leaves of $T_r$ and $e_0 = <V_1, V_2> \in E_T$.

$C_s = \{e | e \in conf(e_0) \text{ and } e \in G|_{leaves(T)}\}$

Block 1002 represents the input of an association tree T and conflict sets $C_s$ of a query graph G.

Block 1004 is a decision block that determines if p is a full outer join:

$$E_T = (V_1, V_2)|^{p_{V_1 V_2}}_{\leftrightarrow}$$

If so, then $p_{v_1 v_2}$ is the only hyperedge that connects leaves $(T_l)$ with leaves$(T_r)$. If so, block 1006 sets:

$$\odot = \stackrel{p_{V_1 V_2}}{\leftrightarrow}$$

which is equivalent to:

$$T = T_l \stackrel{p}{\leftrightarrow} T_r$$

and control then transfers to "A". If not, control transfers to block 1008.

Block 1008 is a decision block that determines if p is a one-sided outer join:

$$E_T = (V_1, V_2)|^{p_{V_1 V_2}}_{\rightarrow}$$

or $$E_T = (V_1, V_2)|^{p_{V_1 V_2}}_{\leftarrow}$$

If so, then $p_{v_1 v_2}$ is the only hyperedge that connects leaves $(T_l)$ with leaves$(T_r)$. If not, control transfers to "B"; otherwise, control transfers to block 1010. Block 1010 is a decision block that determines if $C_s = \phi$. If so, then block 1012 sets:

$$\odot = \stackrel{p_{V_1 V_2}}{\rightarrow}$$

or $$\odot = \stackrel{p_{V_1 V_2}}{\leftarrow}$$

respectively, which is equivalent to:

$$T = T_l \stackrel{p}{\rightarrow} T_r$$

or $$T = T_l \stackrel{p}{\leftarrow} T_r$$

respectively, and control then transfers to "A". If not, then block 1014 sets $T' = \phi$ and block 1016 returns the empty operator tree.

At "B", block 1018 is a decision block that determines if $C_s = \phi$. If so, then block 1020 sets:

$$\odot = \stackrel{p_{V_1 V_2} \wedge \ldots \wedge p_{V_{n-1} V_n}}{\bowtie}$$

which is equivalent to:

$$T = T_l \stackrel{p_{V_1 V_2} \wedge \ldots \wedge p_{V_{n-1} V_n}}{\bowtie} T_r$$

and control then transfers to "A". If not, then block 1022 sets $T' = \phi$ and block 1024 returns the empty operator tree.

At "A", block 1026 recursively invokes the CONFLICT-FREE OPERATOR ASSIGNMENT procedure using sub-tree $T_l$ and query hypergraph G, and then block 1028 recursively invokes the CONFLICT-FREE OPERATOR ASSIGNMENT procedure using sub-tree $T_r$ and query hypergraph G. Block 1030 represents the output of an operator tree T' for association tree T.

GENERAL OPERATOR ASSIGNMENT

Figure 11A:
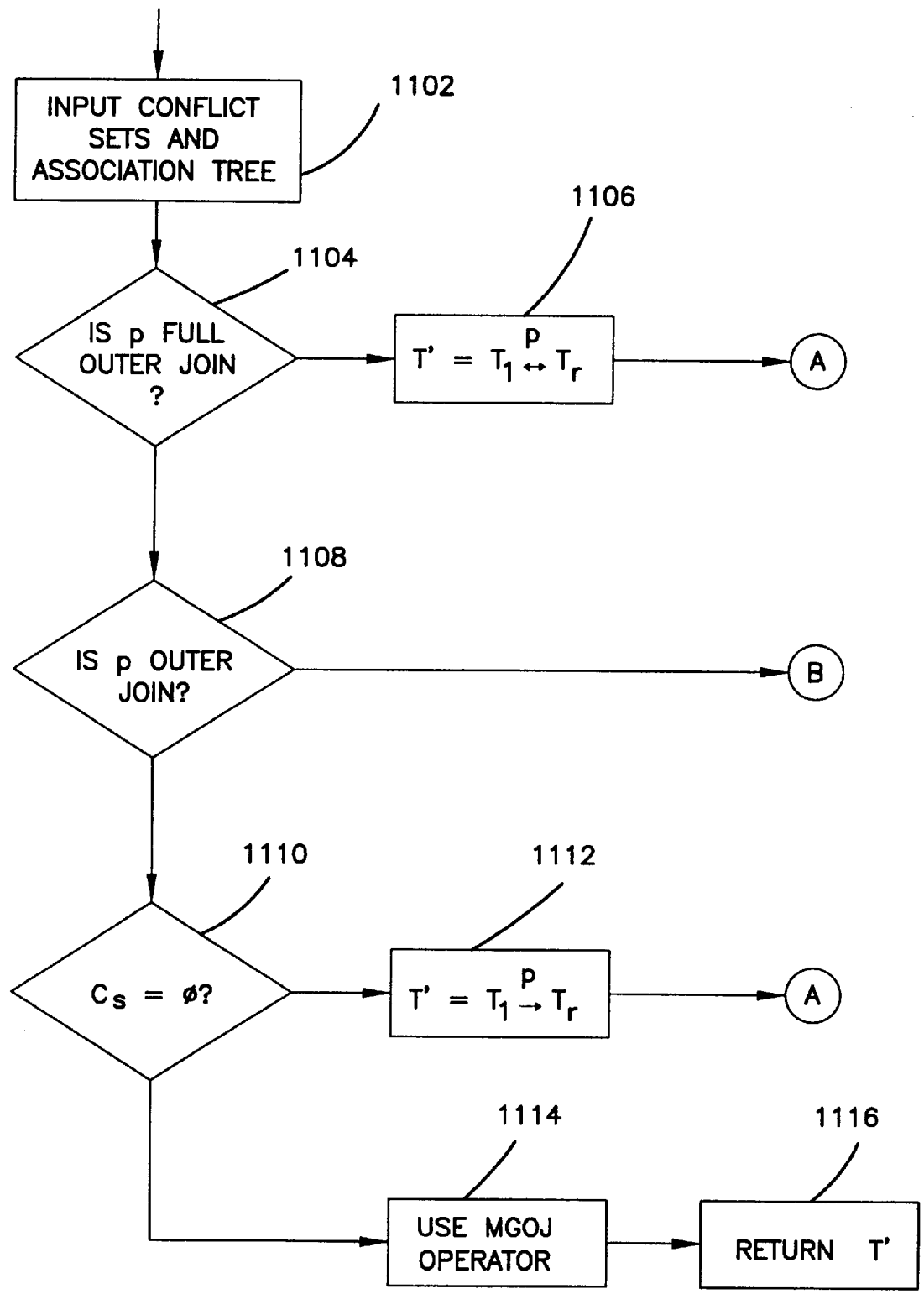
FIGS. 11A, 11B, and 11C together are a flowchart illustrating the method of performing general operator assignments for the association trees according to the present invention.
Figure 11B:
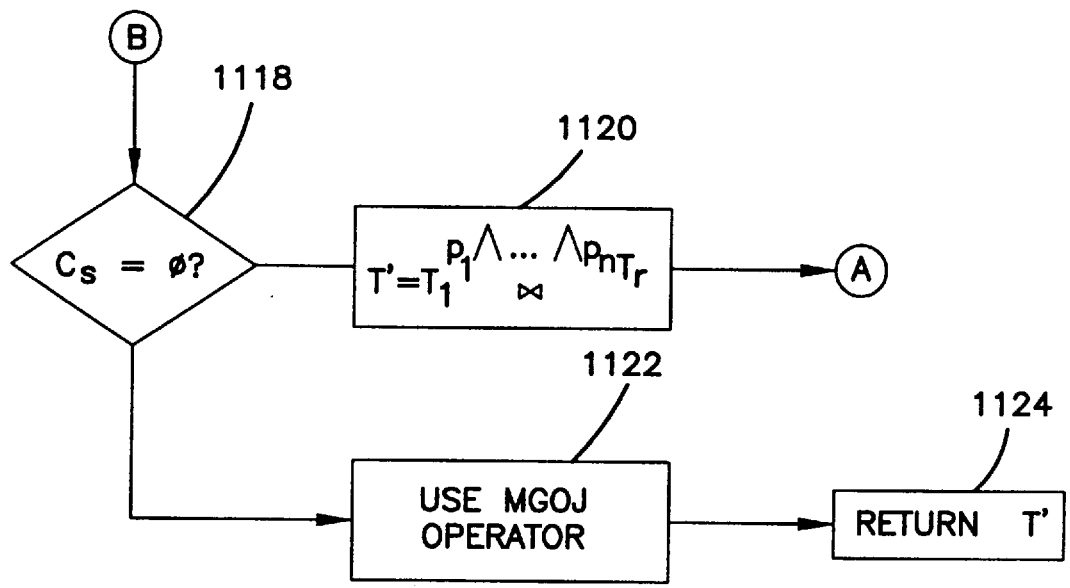
Figure 11C:
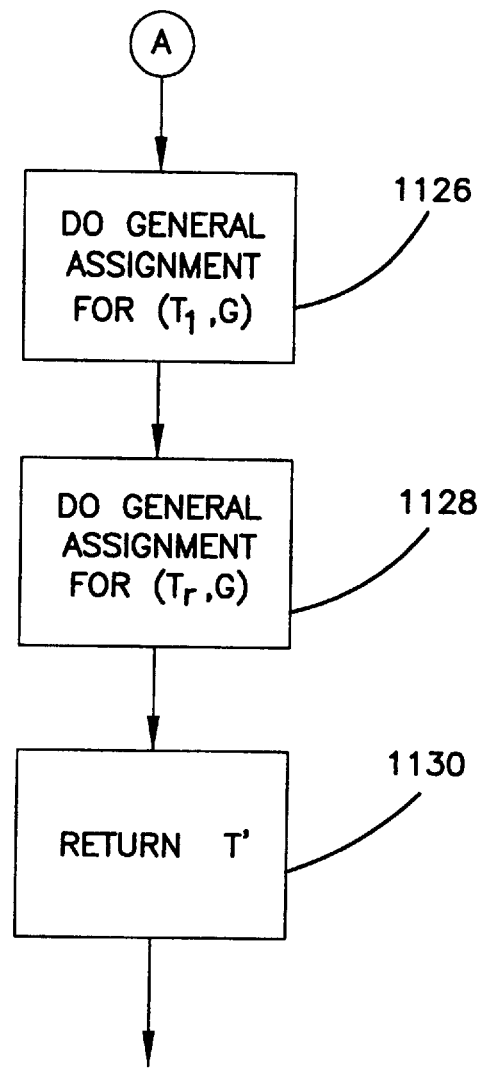

FIGS. 11A, 11B, and 11C together are a flowchart illustrating the method of performing general operator assignments for the association trees according to the present invention. The conflict-free operator assignment does not generate operator trees for all possible association trees of a given query. Therefore, the general operator assignment is presented that can generate an operator tree for any association tree by employing MGOJ operators and preserved sets.

This procedure uses the following notation:

$T=T_l \cdot T_r$, wherein $T_l$ is a left sub-tree of T and $T_r$ is a right sub-tree of T.

$T=T_l \odot T_r$, wherein $\odot$ is the operator selected as the root of T.

$E_T$ is the set of (hyper)edges in G that connects leaves of $T_l$ with leaves of $T_r$ and $e_0 = <V_1, V_2> \in E_T$.

$C_s = \{e | e \in conf(e_0) \text{ and } e \in G|_{leaves(T)}\}$

Block 1102 represents the input of an association tree and conflict sets $C_s$ of a query graph G.

Block 1104 is a decision block that determines if p is a full outer join:

$$E_T = (V_1, V_2)|^{p_{V_1 V_2}}_{\leftrightarrow}$$

If so, then $p_{v_1 v_2}$ is the only hyperedge that connects leaves $(T_l)$ with leaves$(T_r)$. If so, block 1106 sets:

$$\odot = \stackrel{p_{V_1 V_2}}{\leftrightarrow}$$

which is equivalent to:

$$T = T_l \overset{p}{\underset{\leftrightarrow}{}} T_r$$

and control then transfers to "A". If not, control transfers to block 1108.

Block 1108 is a decision block that determines if p is a one-sided outer join:

$$E_T = (V_1, V_2)|\overset{p_{V_1V_2}}{\rightarrow}$$

or $$E_T = (V_1, V_2)|\overset{p_{V_1V_2}}{\leftarrow}$$

If so, then $p_{V_1V_2}$ is the only hyperedge that connects leaves ($T_l$) with leaves($T_r$). If not, control transfers to "B"; otherwise, control transfers to block 1110.

Block 1110 is a decision block that determines if $C_s = \phi$. If so, then block 1112 sets:

$$\odot = \overset{p_{V_1V_2}}{\rightarrow}$$

or $$\odot = \overset{p_{V_1V_2}}{\leftarrow}$$

respectively, which is equivalent to:

$$T = T_l \overset{p}{\underset{\rightarrow}{}} T_r$$

or $$T = T_l \overset{p}{\underset{\leftarrow}{}} T_r$$

respectively, and control then transfers to "A". If not, then block 1114 sets:

$$\odot = MGOJ \left[ p_{V_1V_2}, pres\left(\overset{p_{V_1V_2}}{\rightarrow}\right) \cap \text{leaves}(T), \right.$$
$$pres_{p_{V_1V_2}}(e_1) \cap \text{leaves}(T), \ldots$$
$$\left. pres_{p_{V_1V_2}}(e_n) \cap \text{leaves}(T) \right]$$

where $e \in E_T$ and block 1116 returns.

At "B", block 1118 is a decision block that determines if $C_s = \phi$. If so, then block 1120 sets:

$$\odot = \overset{p_{V_1V_2} \wedge \ldots \wedge p_{V_{n-1}V_n}}{\bowtie}$$

which is equivalent to:

$$T = T_l \overset{p_{V_1V_2} \wedge \ldots \wedge p_{V_{n-1}V_n}}{\bowtie} T_r$$

and control then transfers to "A". If not, then block 1122 sets:

$$\odot = MGOJ[p_{V_1V_2} \wedge \ldots \wedge p_{V_{n-1}V_n}, pres_e(e_1) \cap \text{leaves}(T), \ldots$$
$$pres_e(e_n) \cap \text{leaves}(T)]$$

where $e \in E_T$, and block 1124 returns.

At "A", block 1126 recursively invokes the GENERAL OPERATOR ASSIGNMENT procedure using sub-tree $T_1$ and query hypergraph G, and then block 1128 recursively invokes the GENERAL OPERATOR ASSIGNMENT procedure using sub-tree $T_r$ and query hypergraph G. Block 1130 represents the output of an operator tree T' for association tree T.

EXAMPLE SQL QUERY OPTIMIZATION

In one example according to the present invention, consider a query:

$$Q_1 = X_1 \overset{p_{1,3}}{\underset{\leftrightarrow}{}} \left( \left( X_2 \overset{p_{2,3}}{\underset{\bowtie}{}} X_3 \right)^{p_{2,4} \wedge p_{3,4}} X_4 \right)$$

where $X_i = <R_i, V_i, E_i>$, $1 \leq i \leq 4$, is a base relation and $p_{i,j}$ is the predicate between relations $X_i$ and $X_j$. The following association trees of $Q_1$ are generated by the ASSOCIATION TREES procedure:

$(X_1 \cdot (X_2 \cdot X_3)) \cdot X_4$
$((X_1 \cdot X_3) \cdot X_2) \cdot X_4$
$X_1 \cdot ((X_2 \cdot X_3) \cdot X_4)$ The CONFLICT-FREE OPERATOR ASSIGNMENT procedure generates the following operator trees:

$$\left( X_1 \overset{p_{1,3}}{\underset{\leftrightarrow}{}} \left( X_2 \overset{p_{2,3}}{\underset{\bowtie}{}} X_3 \right) \right)^{p_{2,4} \wedge p_{3,4}} X_4$$

$$X_1 \overset{p_{1,3}}{\underset{\leftrightarrow}{}} \left( \left( X_2 \overset{p_{2,3}}{\underset{\bowtie}{}} X_3 \right)^{p_{2,4} \wedge p_{3,4}} X_4 \right)$$

The GENERAL OPERATOR ASSIGNMENT procedure generates the following operator trees:

$$\left( X_1 \overset{p_{1,3}}{\underset{\leftrightarrow}{}} \left( X_2 \overset{p_{2,3}}{\underset{\bowtie}{}} X_3 \right) \right)^{p_{2,4} \wedge p_{3,4}} X_4$$

$$X_1 \overset{p_{1,3}}{\underset{\leftrightarrow}{}} \left( \left( X_2 \overset{p_{2,3}}{\underset{\bowtie}{}} X_3 \right)^{p_{2,4} \wedge p_{3,4}} X_4 \right)$$

$$\left( \left( X_1 \overset{p_{1,3}}{\underset{\leftrightarrow}{}} X_3 \right) MGOJ[p_{2,3}, X_1]X_2 \right)^{p_{2,4} \wedge p_{3,4}} X_4$$

IDENTITIES FOR JOIN, OUTER AND FULL OUTER ASSOCIATION

Let $X_i = <R_i, V_i, E_i>$, where $1 \leq i \leq 3$, be an expression, $p_{i,j}$ denotes the predicate(s) between expressions $X_i$ and $X_j$, then:

$$X_1 \overset{p_{1,2}}{\underset{\rightarrow}{}} \left( X_2 \overset{p_{2,3}}{\underset{\bowtie}{}} X_3 \right) = \left( X_1 \overset{p_{1,2}}{\underset{\rightarrow}{}} X_2 \right) MGOJ[p_{2,3}, X_1]X_3 \quad (3)$$

$$X_1 \overset{p_{1,2}}{\underset{\leftrightarrow}{}} \left( X_2 \overset{p_{2,3}}{\underset{\bowtie}{}} X_3 \right) = \left( X_1 \overset{p_{1,2}}{\underset{\leftrightarrow}{}} X_2 \right) MGOJ[p_{2,3}, X_1]X_3 \quad (4)$$

$$X_1 \overset{p_{1,2}}{\underset{\leftrightarrow}{}} \left( X_2 \overset{p_{2,3}}{\underset{\leftarrow}{}} X_3 \right) = \left( X_1 \overset{p_{1,2}}{\underset{\leftrightarrow}{}} X_2 \right) MGOJ[p_{2,3}, X_1, X_3]X_3 \quad (5)$$

$$X_1 \overset{p_{1,2}}{\underset{\leftrightarrow}{}} (X_2 MGOJ[p_{2,3}, X_2'X_3']X_3) = \quad (6)$$

-continued $$\left( X_1 \overset{p_{1,2}}{\underset{\leftrightarrow}{\bowtie}} X_2 \right) MGOJ[p_{2,3}, X_1, X_{2'}, X_{3'}] X_3$$

where $R_{X_{2'}} \subseteq R_2$ and $R_{X_{3'}} \subseteq R_3$. In addition to the above identities, the following identities are also used:

$$\left( X_1 \overset{p_{1,2}}{\bowtie} X_2 \right) \overset{p_{1,3} \wedge p_{2,3}}{\bowtie} X_3 = X_1 \overset{p_{1,2} \wedge p_{1,3}}{\bowtie} \left( X_2 \overset{p_{2,3}}{\bowtie} X_3 \right) \quad (7)$$

$$\left( X_1 \overset{p_{1,2}}{\bowtie} X_2 \right) \overset{p_{2,3}}{\rightarrow} X_3 = X_1 \overset{p_{1,2}}{\bowtie} \left( X_2 \overset{p_{2,3}}{\rightarrow} X_3 \right) \quad (8)$$

$$\left( X_1 \overset{p_{1,2}}{\rightarrow} X_2 \right) \overset{p_{2,3}}{\rightarrow} X_3 = X_1 \overset{p_{1,2}}{\rightarrow} \left( X_2 \overset{p_{2,3}}{\rightarrow} X_3 \right) \quad (9)$$

$$\left( X_1 \overset{p_{1,2}}{\leftarrow} X_2 \right) \overset{p_{2,3}}{\rightarrow} X_3 = X_1 \overset{p_{1,2}}{\leftarrow} \left( X_2 \overset{p_{2,3}}{\rightarrow} X_3 \right) \quad (10)$$

$$\left( X_1 \overset{p_{1,2}}{\leftrightarrow} X_2 \right) \overset{p_{2,3}}{\leftrightarrow} X_3 = X_1 \overset{p_{1,2}}{\leftrightarrow} \left( X_2 \overset{p_{2,3}}{\leftrightarrow} X_3 \right) \quad (11)$$

$$\left( X_1 \overset{p_{1,2}}{\leftrightarrow} X_2 \right) \overset{p_{2,3}}{\rightarrow} X_3 = X_1 \overset{p_{1,2}}{\leftrightarrow} \left( X_2 \overset{p_{2,3}}{\rightarrow} X_3 \right) \quad (12)$$

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method for reordering complex SQL queries containing joins, outer and full outer joins. The method first translates the query into a hypergraph representation. Required sets, conflict sets and preserved sets are then generated for the query hypergraph. Using the required sets, a plurality of plans are enumerated, wherein the plans represent associative re-orderings of relations in the query. SQL operators are selectively assigned to each of the enumerated plans using the conflict sets and/or preserved sets, so that the results from the plans are identical to the original query. A novel Modified General Outer Join (MGOJ) operator may be assigned to the root of a sub-tree, wherein the MGOJ operator is a compensation operator. The operator assignment is performed recursively for the root of each sub-tree in the plan. One of the enumerated plans (generally the most optimal) is then selected for execution.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of reordering a query in a computer having a memory, the query being used by the computer to direct information retrieval from a relational database stored in an electronic storage device coupled to the computer, the method comprising the steps of:

(a) accepting the query into the memory of the computer;
    (b) enumerating one or more plans for the query in the memory of the computer, wherein the enumerated plans represent associative re-orderings of relations in the query; and
    (c) selectively assigning a Modified General Outer Join (MGOJ) operator at a root of one or more of the enumerated plans.

2. The method of claim 1, further comprising the step of:

(d) selecting one of the enumerated plans for execution by the computer according to a predefined criteria for the retrieval of the information from the relational database stored in the electronic storage device.

3. The method of claim 1, wherein the MGOJ operator is a compensation operator.

4. The method of claim 1, wherein the MGOJ operator comprises a relation $<R_1 R_2, V_1 V2, E'>$ in an expression comprising:

$$r_1 MGOJ\ [p, X_1, \ldots, X_n, Y_1, \ldots, Y_{n'}] r_2$$

for relations $r_1$ and $r_2$ that preserves relations $X_i$ and $Y_j$, wherein:

$r_1 = <R_1, V_1, E_1>$, wherein $R_1$ is a non-empty set of real attributes, $V_1$ is a non-empty set of virtual attributes, and $E_1$ is a set of tuples that comprise the relation $r_1$, $r_2 = <R_2, V_2, E_2>$, wherein $R_2$ is a non-empty set of real attributes, $V_2$ is a non-empty set of virtual attributes, and $E_2$ is a set of tuples that comprise the relation $r_2$, $R_1 \cap R_2 = \phi$, $V_1 \cap V_2 = \phi$, $X_i = <R_{x_i}, V_{x_i}, E_{x_i}>$ for $1 \leq i \leq n$, $Y_j = <R_{y_j}, V_{y_j}, E_{y_j}>$ for $1 \leq j \leq n'$, $X_i$ and $Y_j$ are relations such that $R_{x_i} \cap R_{x_k} = V_{x_i} \cap V_{x_k} = \phi$, $R_{y_j} \cap R_{y_s} = V_{y_j} \cap V_{y_s} = \phi$, $R_{x_i} \subseteq R_1$ and $R_{y_j} \subseteq R_2$, where $i \neq k$, $j \neq s$, $1 \leq i$, $k \leq n$, and $1 \leq j, s \leq n'$, $$E' = \left( r_1 \overset{p}{\bowtie} r_2 \right) \uplus \underset{i=1}{\overset{n}{}} \left\{ t | t \in \left( \pi^c_{X_i V_{x_i}}(E_1) - \pi^c_{X_i V_{x_i}}\left( E_1 \overset{p}{\bowtie} E_2 \right) \right) \right\}$$
$$\uplus \underset{j=1}{\overset{n'}{}} \left\{ t | t \in \left( \pi^c_{Y_j V_{y_j}}(E_2) - \pi^c_{Y_j V_{y_j}}\left( E_1 \overset{p}{\bowtie} E_2 \right) \right) \right\}$$

$p_{i,j}$ is a predicate for $$X_i \overset{p}{\odot} X_j,$$

$\odot \in \{\bowtie, \rightarrow, \leftarrow, \leftarrow \rightarrow\}$ defines operators for the query, $\bowtie$ denotes a join operation, $\rightarrow$ denotes a left outer join operation, $\leftarrow$ denotes a right outer join operation, $\leftarrow \rightarrow$ denotes a full outer join operation, and $\pi^c$ denotes a projection operation.

5. The method of claim 4, wherein the assigning step comprises replacing:

$$X_1 \overset{p_{1,2}}{\rightarrow} \left( X_2 \overset{p_{2,3}}{\bowtie} X_3 \right)$$

with:

$$\left( X_1 \overset{p_{1,2}}{\rightarrow} X_2 \right) MGOJ[p_{2,3}, X_1] X_3$$

6. The method of claim 4, wherein the assigning step comprises replacing:

$$X_1 \underset{\leftrightarrow}{^{p_{1,2}}} \left( X_2 \underset{\bowtie}{^{p_{2,3}}} X_3 \right)$$

with:

$$\left( X_1 \underset{\leftrightarrow}{^{p_{1,2}}} X_2 \right) MGOJ[p_{2,3}, X_1] X_3$$

7. The method of claim 4, wherein the assigning step comprises replacing:

$$X_1 \underset{\leftrightarrow}{^{p_{1,2}}} \left( X_2 \underset{\leftarrow}{^{p_{2,3}}} X_3 \right)$$

with:

$$\left( X_1 \underset{\leftrightarrow}{^{p_{1,2}}} X_2 \right) MGOJ[p_{2,3}, X_1, X_3] X_3$$

8. The method of claim 4, wherein the assigning step comprises replacing:

$$X_1 \underset{\leftrightarrow}{^{p_{1,2}}} (X_2 MGOJ[p_{2,3} X_2', X_3'] X_3$$

with:

$$\left( X_1 \underset{\leftrightarrow}{^{p_{1,2}}} X_2 \right) MGOJ[p_{2,3}, X_1, X_2', X_3'] X_3$$

9. An apparatus for reordering a query, comprising:
(a) a computer having a memory, the query being used by the computer to direct information retrieval from a relational database stored in an electronic storage device coupled to the computer, the computer further comprising:
  (1) means for accepting the query into the memory of the computer;
  (2) means for enumerating one or more plans for the query in the memory of the computer, wherein the enumerated plans represent associative re-orderings of relations in the query; and
  (3) means for selectively assigning a Modified General Outer Join (MGOJ) operator at a root of one or more of the enumerated plans.

10. The apparatus of claim 9, wherein the computer further comprises:
  (4) means for selecting one of the enumerated plans for execution by the computer according to a predefined criteria for the retrieval of the information from the relational database stored in the electronic storage device.

11. The apparatus of claim 9, wherein the MGOJ operator is a compensation operator.

12. The apparatus of claim 9, wherein the MGOJ operator comprises a relation $<R_i R_2, V_1 V2, E'>$ in an expression comprising:

$$r_1 MGOJ [p, X_1, \ldots, X_n, Y_1, \ldots, Y_{n'}] r_2$$

for relations $r_1$ and $r_2$ that preserves relations $X_i$ and $Y_j$, wherein:
  $r_1 = <R_1, V_1, E_1>$, wherein $R_1$ is a non-empty set of real attributes, $V_1$ is a non-empty set of virtual attributes, and $E_1$ is a set of tuples that comprise the relation $r_1$,
  $r_2 = <R_2, V_2, E_2>$, wherein $R_2$ is a non-empty set of real attributes, $V_2$ is a non-empty set of virtual attributes, and $E_2$ is a set of tuples that comprise the relation $r_2$, $R_1 \cap R_2 = \phi$,
$V_1 \cap V_2 = \phi$,
$X_i = <R_{x_i}, V_{x_i}, E_{x_i}>$ for $1 \leq i \leq n$,
$Y_j = <R_{y_j}, V_{y_j}, E_{y_j}>$ for $1 \leq j \leq n'$,
$X_i$ and $Y_j$ are relations such that
$R_{x_i} \cap R_{x_k} = V_{x_i} \cap V_{x_k} = \phi$, $R_{y_j} \cap R_{y_s} = V_{y_j} \cap V_{y_s} = \phi$, $R_{x_i} \subseteq R_1$ and $R_{y_j} \subseteq R_2$, where $i \neq k$, $j \neq s$, $1 \leq i, k \leq n$, and $1 \leq j, s \leq n'$, $$E' = \left( r_1 \underset{\bowtie}{^p} r_2 \right) \uplus \underset{i=1}{\overset{n}{\uplus}} \left\{ t | t \in \left( \pi^c_{X_i V_{xi}}(E_1) - \pi^c_{X_i V_{xi}} \left( E_1 \underset{\bowtie}{^p} E_2 \right) \right) \right\}$$

$$\uplus \underset{j=1}{\overset{n'}{\uplus}} \left\{ t | t \in \left( \pi^c_{Y_j V_{yj}}(E_2) - \pi^c_{Y_j V_{yj}} \left( E_1 \underset{\bowtie}{^p} E_2 \right) \right) \right\}$$

$p_{i,j}$ is a predicate for $$X_i \underset{\circ}{^p} X_j,$$

$\bigcirc \in \{\bowtie, \rightarrow, \leftarrow, \leftarrow\rightarrow\}$ defines operators for the query, $\bowtie$ denotes a join operation, $\rightarrow$ denotes a left outer join operation, $\leftarrow$ denotes a right outer join operation, $\leftarrow\rightarrow$ denotes a full outer join operation, and
$\pi^c$ denotes a projection operation.

13. The apparatus of claim 12, wherein the means for assigning comprises means for replacing:

$$X_1 \underset{\rightarrow}{^{p_{1,2}}} \left( X_2 \underset{\bowtie}{^{p_{2,3}}} X_3 \right)$$

with:

$$\left( X_1 \underset{\rightarrow}{^{p_{1,2}}} X_2 \right) MGOJ[p_{2,3}, X_1] X_3$$

14. The apparatus of claim 12, wherein the means for assigning comprises means for replacing:

$$X_1 \underset{\leftrightarrow}{^{p_{1,2}}} \left( X_2 \underset{\bowtie}{^{p_{2,3}}} X_3 \right)$$

with:

$$\left( X_1 \underset{\leftrightarrow}{^{p_{1,2}}} X_2 \right) MGOJ[p_{2,3}, X_1] X_3$$

15. The apparatus of claim 12, wherein the means for assigning comprises means for replacing:

$$X_1 \underset{\leftrightarrow}{^{p_{1,2}}} \left( X_2 \underset{\leftarrow}{^{p_{2,3}}} X_3 \right)$$

with:

$$\left( X_1 \underset{\leftrightarrow}{^{p_{1,2}}} X_2 \right) MGOJ[p_{2,3}, X_1, X_3] X_3$$

16. The apparatus of claim 12, wherein the means for assigning comprises means for replacing:

$$X_1 \underset{\leftrightarrow}{^{p_{1,2}}} (X_2 MGOJ[p_{2,3}, X_2', X_3'] X_3$$

with:

$$\left( X_1 \underset{\leftrightarrow}{^{p_{1,2}}} X_2 \right) MGOJ[p_{2,3}, X_1, X_2', X_3'] X_3$$

17. A program storage device, readable by a computer, tangibly embodying a program of instructions executable by the computer to perform method steps reordering a query in a computer having a memory, the query being used by the computer to direct information retrieval from a relational database stored in an electronic storage device coupled to the computer, the method comprising the steps of:

(a) accepting the query into the memory of the computer;

(b) enumerating one or more plans for the query in the memory of the computer, wherein the enumerated plans represent associative re-orderings of relations in the query; and (c) selectively assigning a Modified General Outer Join (MGOJ) operator at a root of one or more of the enumerated plans.

18. The method of claim 17, further comprising the step of:

(d) selecting one of the enumerated plans for execution by the computer according to a predefined criteria for the retrieval of the information from the relational database stored in the electronic storage device.

19. The method of claim 17, wherein the MGOJ operator is a compensation operator.

20. The method of claim 17, wherein the MGOJ operator comprises a relation $<R_1R_2,V_1V_2,E'>$ in an expression comprising:

$$r_1 MGOJ\ [p,X_1,\ldots,X_n,Y_1,\ldots,Y_{n'}]r_2$$

for relations $r_1$ and $r_2$ that preserves relations $X_i$ and $Y_j$, wherein:

$r_1 = <R_1,V_1,E_1>$, wherein $R_1$ is a non-empty set of real attributes, $V_1$ is a non-empty set of virtual attributes, and $E_1$ is a set of tuples that comprise the relation $r_1$, $r_2 = <R_2,V_2,E_2>$, wherein $R_2$ is a non-empty set of real attributes, V is a non-empty set of virtual attributes, and $E_2$ is a set of tuples that comprise the relation $r_2$, $R_1 \cap R_2 = \phi$, $V_1 \cap V_2 = \phi$, $X_i = <R_{x_i}, V_{x_i}, E_{x_i}>$ for $1 \leq i \leq n$, $Y_j = <R_{y_j}, V_{y_j}, E_{y_j}>$ for $1 \leq j \leq n'$, $X_i$ and $Y_j$ are relations such that $R_{x_i} \cap R_{x_k} = V_{x_i} \cap V_{x_k} = \phi$, $R_{y_j} \cap R_{y_s} = V_{y_j} \cap V_{y_s} = \phi$, $R_{x_i} \subseteq R_1$ and $R_{y_j} \subseteq R_2$, where $i \neq k$, $j \neq s$, $1 \leq i,k \leq n$, and $1 \leq j,s \leq n'$, $$E' = \left( r_1 \underset{\bowtie}{p} r_2 \right) \uplus_{i=1}^{n} \left\{ t | t \in \left( \pi^c_{X_i V_{xi}}(E_1) - \pi^c_{X_i V_{xi}} \left( E_1 \underset{\bowtie}{p} E_2 \right) \right) \right\}$$

$$\uplus_{j=1}^{n'} \left\{ t | t \in \left( \pi^c_{Y_j V_{yj}}(E_2) - \pi^c_{Y_j V_{yj}} \left( E_1 \underset{\bowtie}{p} E_2 \right) \right) \right\}$$

$p_{i,j}$ is a predicate for $$X_i \overset{p}{\underset{\odot}{}} X_j,$$

$\odot \in \{\bowtie, \rightarrow, \leftarrow, \leftarrow\rightarrow\}$ defines operators for the query, $\bowtie$ denotes a join operation, $\rightarrow$ denotes a left outer join operation, $\leftarrow$ denotes a right outer join operation, $\leftarrow\rightarrow$ denotes a full outer join operation, and $\pi^c$ denotes a projection operation.

21. The method of claim 20, wherein the assigning step comprises replacing:

$$X_1 \underset{\rightarrow}{p_{1,2}} \left( X_2 \underset{\bowtie}{p_{2,3}} X_3 \right)$$

with:

$$\left( X_1 \underset{\rightarrow}{p_{1,2}} X_2 \right) MGOJ[p_{2,3}, X_1]X_3$$

22. The method of claim 20, wherein the assigning step comprises replacing:

$$X_1 \underset{\leftrightarrow}{p_{1,2}} \left( X_2 \underset{\bowtie}{p_{2,3}} X_3 \right)$$

with:

$$\left( X_1 \underset{\leftrightarrow}{p_{1,2}} X_2 \right) MGOJ[p_{2,3}, X_1]X_3$$

23. The method of claim 20, wherein the assigning step comprises replacing:

$$X_1 \underset{\leftrightarrow}{p_{1,2}} \left( X_2 \underset{\leftarrow}{p_{2,3}} X_3 \right)$$

with:

$$\left( X_1 \underset{\leftrightarrow}{p_{1,2}} X_2 \right) MGOJ[p_{2,3}, X_1, X_3]X_3$$

24. The method of claim 20, wherein the assigning step comprises replacing:

$$X_1 \underset{\leftrightarrow}{p_{1,2}} (X_2 MGOJ[p_{2,3}, X_2', X_3']X_3$$

with:

$$\left( X_1 \underset{\leftrightarrow}{p_{1,2}} X_2 \right) MGOJ[p_{2,3}, X_1, X_2', X_3']X_3$$

* * * * *

UNITED STATES PATENT AND TRADEMARK OFFICE
CERTIFICATE OF CORRECTION

PATENT NO. : 5,832,477

DATED : November 3, 1998

INVENTOR(S) : Gautam Bhargava, Piyush Goel, Balakrishna Ragmavendra Iyer

It is certified that error appears in the above-identified patent and that said Letters Patent is hereby corrected as shown below: On the title page:

Under [56] OTHER PUBLICATIONS, Page 1:

After "Eng.," and before ", pp.57-68" insert --SE-9--.

After "Galindo-Legaria, C.A. "Algebraic", "Optimzation" should read --Optimization--.

Under [56] OTHER PUBLICATIONS, Page 2:

After "Paulley, G.N., and Per-Ake Larson, 'Exploiting", "Uniquences" should read --Uniqueness--.

After "in Query" and before "CASCON" "Optimazation" should read --Optimization--.

After "Rule Based Query Rewrite Optimization" insert --in Starburst--.

After "Selinger, P.G., "Anstrahan" should read --Astrahan--.

After "Dependence in Query" "Decompositio n" should read --Decomposition--.

Signed and Sealed this

Third Day of April, 2001

*Attest:*

NICHOLAS P. GODICI

*Attesting Officer*     *Acting Director of the United States Patent and Trademark Office*